US012061833B2

(12) United States Patent
Zhu et al.

(10) Patent No.: US 12,061,833 B2
(45) Date of Patent: Aug. 13, 2024

(54) MULTI-WINDOW DISPLAY METHOD, ELECTRONIC DEVICE, AND SYSTEM

(71) Applicant: HUAWEI TECHNOLOGIES CO., LTD., Guangdong (CN)

(72) Inventors: Dengkui Zhu, Shenzhen (CN); Chen Chen, Wuhan (CN); Hui Xu, Shenzhen (CN); Wenyan Cao, Bejing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/770,372

(22) PCT Filed: Nov. 19, 2020

(86) PCT No.: PCT/CN2020/130112
§ 371 (c)(1),
(2) Date: Apr. 20, 2022

(87) PCT Pub. No.: WO2021/129253
PCT Pub. Date: Jul. 1, 2021

(65) Prior Publication Data
US 2022/0398059 A1     Dec. 15, 2022

(30) Foreign Application Priority Data
Dec. 26, 2019 (CN) .......................... 201911366233.2

(51) Int. Cl.
*G06F 3/14* (2006.01)
*G06F 3/04817* (2022.01)
(Continued)

(52) U.S. Cl.
CPC ........ *G06F 3/1454* (2013.01); *G06F 3/04817* (2013.01); *G06F 3/0482* (2013.01);
(Continued)

(58) Field of Classification Search
CPC .. G06F 3/1454; G06F 3/04817; G06F 3/0482; G06F 3/0484; G06F 3/1423; G06F 2203/04803
See application file for complete search history.

(56) References Cited

U.S. PATENT DOCUMENTS

| 8,078,688 B2 | 12/2011 | Ansari et al. |
| 9,678,810 B2 | 6/2017 | Reeves et al. |

(Continued)

FOREIGN PATENT DOCUMENTS

| CN | 104376090 A | 2/2015 |
| CN | 104965702 A | 10/2015 |

(Continued)

OTHER PUBLICATIONS

Lu's Tech Source, "Using Samsung Dex on a PC", (Nov. 10, 2019), URL: https://www.youtube.com/watch?v=cy-3WZV-E04, p. 1-23 (Year: 2019).*

(Continued)

*Primary Examiner* — Mong-Shune Chung
(74) *Attorney, Agent, or Firm* — HUAWEI TECHNOLOGIES CO., LTD.

(57) ABSTRACT

Embodiments of this application provide a multi-window display method, a first electronic device, and a second electronic device. The method is applied to the first electronic device and the second electronic device that communicate with each other. When a plurality of applications run on a mobile phone, a plurality of windows of the mobile phone can be displayed on a PC, and each window is correspondingly used to display a different application. A user can perform an operation on each mobile phone application by using a window that corresponds to the mobile phone application and that is displayed on the PC. In addition, the operation performed by the user on the mobile phone application on the PC does not affect use of another (Continued)

function of the user on the mobile phone. This improves office efficiency such as file sharing, and improves user experience.

26 Claims, 20 Drawing Sheets

(51) Int. Cl.
   *G06F 3/0482* (2013.01)
   *G06F 3/0484* (2022.01)
(52) U.S. Cl.
   CPC .......... *G06F 3/0484* (2013.01); *G06F 3/1423* (2013.01); *G06F 2203/04803* (2013.01)

(56) References Cited

U.S. PATENT DOCUMENTS

| | | | | |
|---|---|---|---|---|
| 2012/0040720 | A1* | 2/2012 | Zhang | G06F 3/1454 455/557 |
| 2013/0278484 | A1 | 10/2013 | Hwang et al. | |
| 2014/0298355 | A1* | 10/2014 | Kim | G06F 3/1454 719/313 |
| 2016/0054757 | A1* | 2/2016 | Reeves | G06F 1/1649 715/761 |
| 2017/0177690 | A1 | 6/2017 | Ritter et al. | |
| 2018/0101199 | A1* | 4/2018 | Myung | G09G 3/002 |
| 2019/0012769 | A1* | 1/2019 | Arrieta | H04L 67/04 |
| 2019/0296930 | A1* | 9/2019 | Roman | G06F 3/04845 |
| 2020/0019431 | A1* | 1/2020 | Kim | G06F 9/48 |
| 2021/0042002 | A1* | 2/2021 | Lee | G06F 15/173 |
| 2022/0164091 | A1* | 5/2022 | Kang | G06F 3/1423 |

FOREIGN PATENT DOCUMENTS

| | | |
|---|---|---|
| CN | 105518643 A | 4/2016 |
| CN | 106201389 A | 12/2016 |
| CN | 110086938 A | 8/2019 |
| CN | 110471639 A | 11/2019 |
| CN | 110515576 A | 11/2019 |
| JP | 2013143137 A | 7/2013 |
| JP | 2015012512 A | 1/2015 |
| WO | 2017173793 A1 | 10/2017 |

OTHER PUBLICATIONS

ETA Prime, "Samsung DEX Is Awesome!—Gaming,Emulation,Work and Linux On Dex", (Aug. 10, 2019), URL: https:// www.youtube. com/watch?v=zcJmOTAghpM, p. 1-3 (Year: 2019).*

Lu's Tech Source, "Using Samsung Dex on a PC", (Nov. 10, 2019), URL: https://www.youtube.com/watch?v=cy-3WZV-E04, p. 1-28 (Year: 2019).*

Reddit, "Closing Apps (DEX Mode)", (2021), <URL: https://www. reddit.com/r/SamsungDex/comments/nvfvck/closing_apps_dex_mode/?sort=old>, p. 1-2 (Year: 2021).*

I tried DeX for Windows on Galaxy Note 10,I feel that it has a future, but is it still a long way off.pdf [Online], Aug. 25, 2019, [Date of search: May 17, 2023], Internet: URL: https://hitoxu.com/022272>, 17 pages (with an English translation).

* cited by examiner

TO (c) The mobile phone 100 transmits the first video stream to the PC 200, and the PC 200 display the mobile phone window

CONT.
FROM

O

Window 40 of the music application: identifier of the music application/coordinates (2100, 1000) of a vertex $O_2$/length 400/width 500/layer information/interface display content information of the second area Virtual area (b) The mobile phone 100 performs encoding to generate a second video stream

TO (c) The mobile phone 100 transmits the second video stream to the PC 200, and the PC 200 display the window of the music application

MULTI-WINDOW DISPLAY METHOD, ELECTRONIC DEVICE, AND SYSTEM

CROSS-REFERENCE TO RELATED APPLICATIONS

This application is a National Stage of International Application No. PCT/CN2020/130112, filed on Nov. 19, 2020, which claims priority to Chinese Patent Application No. 201911366233.2, filed on Dec. 26, 2019. Both of the aforementioned applications are hereby incorporated by reference in their entireties.

TECHNICAL FIELD

Embodiments of this application relate to the field of electronic technologies, and in particular, to a multi-window display method, an electronic device, and a system.

BACKGROUND

Mobile office is increasingly popular in an office scenario. As mobile phones are widely used, the mobile phone has become one of main devices in the mobile office. Therefore, there is an increasing requirement for interconnection between the mobile phone and a personal computer (personal computer, PC), for example, file exchange between the mobile phone and the PC, and projection of a screen of the mobile phone on a display screen of the PC.

In an existing solution of displaying an interface of the mobile phone on the PC, after a connection is established between the mobile phone and the PC, screen content and data can be easily shared between the PC and the mobile phone by using screen sharing software. A user can receive a notification event on the mobile phone by using the PC, and use a plurality of functions of the mobile phone on the PC. For example, after connecting the PC and the mobile phone by using the screen sharing software, the user can receive a notification on the mobile phone by using the PC, for example, make a call by using the PC, easily answer a call by using a pop-up window, or send/receive information. Alternatively, the user can view an incoming call alarm. Alternatively, the user can share a file between the PC and the mobile phone. Optionally, the user can quickly share file and text content between the PC and the mobile phone by performing a drag-and-drop operation. For example, the user inserts a photo on the mobile phone into a word document of the PC, or inserts a file on the PC into the mobile phone when the user sends text information or an email. The screen sharing software mainly displays, in one window of the PC through imaging, all content (for example, an application interface) displayed on the screen of the mobile phone. Multi-window display cannot be implemented.

SUMMARY

This application provides a multi-window display method, an electronic device, and a system. In the method, a plurality of windows of a mobile phone can be displayed on a PC, and a user can perform an operation on each mobile phone application by using a window that corresponds to the mobile phone application and that is displayed on the PC, thereby improving office efficiency such as file sharing, and improving user experience.

According to a first aspect, a multi-window display method is provided, applied to a system including a first electronic device and a second electronic device that communicate with each other, where the method includes: A first electronic device receives size information of a display area of the second electronic device. The first electronic device runs a first application, and displays a first interface of the first application. The first electronic device determines, based on the size information of the display area of the second electronic device and size information corresponding to the first interface, location information of a first window that is of the first interface and that is in the display area of the second electronic device. The first electronic device sends the location information of the first window and display content information of the first interface to the second electronic device. The second electronic device displays the first interface in the first window based on the received location information of the first window and the received display content information of the first interface. If detecting a first operation, the second electronic device sends an instruction for starting a second application to the first electronic device in response to the first operation. The first electronic device starts the second application based on the received instruction for starting the second application. The first electronic device determines, based on the size information of the display area of the second electronic device and size information corresponding to a second interface of the second application, location information of a second window that is of the second interface and that is in the display area of the second electronic device. The first electronic device sends the location information of the second window and display content information of the second interface to the second electronic device. The second electronic device displays the second interface in the second window based on the received location information of the second window and the received display content information of the second interface. The first window and the second window are different windows.

It should be understood that in this embodiment of this application, "displaying a plurality of windows" may be understood as "displaying a plurality of interfaces", and each window is used to display a different interface. For example, a PC displays a plurality of interfaces of a mobile phone by using different windows, such as the first interface and the second interface. Each interface is an interface that can be controlled independently, such as an operation performed by a user on the first interface and an operation performed by the user on the second interface are independent of each other.

It should be further understood that the first electronic device and the second electronic device may communicate with each other in a plurality of different manners, for example, communicate with each other in a connection manner or by using a future communications technology, to transmit data. The connection manner may include a plurality of different connection manners such as a wired connection manner or a wireless connection manner. For example, the first electronic device and the second electronic device may be connected to each other by using a USB data cable. A wireless connection between the first electronic device and the second electronic device may be a Wi-Fi connection, a near connection established through near field communication, a connection established through Bluetooth code scanning, or the like. The first electronic device and the second electronic device may transmit data by using the future communications technology such as a 5G communications network by installing different applications or a same application on the mobile phone and the PC. The connection manner between the mobile phone and the PC is not limited in this embodiment of this application.

It should be further understood that this embodiment of this application sets no limitation on an action of receiving the size information of the display area of the second electronic device by the first electronic device and an action of running the first application and displaying the first interface of the first application by the first electronic device. For example, the first electronic device may first run the first application and display the first interface of the first application, and when the user displays the first interface of the first electronic device by using the second electronic device, an action of obtaining the size information of the display area of the second electronic device by the first electronic device from the second electronic device is triggered. Alternatively, the second electronic device first sends the size information of the display area of the second electronic device to the first electronic device, and then the first electronic device runs the first application and displays the first interface of the first application, and performs another subsequent action.

It should be further understood that when starting the second application based on the received instruction that is sent by the second electronic device and that is for starting the second application, the first electronic device may display the second interface of the second application, that is, the first electronic device runs the second application in the foreground, or the first electronic device does not display the second interface of the second application, that is, the first electronic device runs the second application in the background. This is not limited in this embodiment of this application.

In addition, the first application and the second application may be applications installed on the first electronic device, or may be quick applications that can run instantly. This is not limited in this embodiment of this application.

An example in which the mobile phone is used as the first electronic device and the PC is used as the second electronic device is used. In the foregoing solution, for the mobile phone and the PC that communicate with each other, an interface of the mobile phone may be displayed by using the PC. When the user runs a plurality of applications on the mobile phone, the PC may display a plurality of windows, and each window is used to display a different application. Alternatively, the user may start an application of the mobile phone on the PC, and display the application of the mobile phone by using an independent window. In the method, office efficiency such as file sharing can be improved, and an application of the mobile phone can be used on the PC, thereby improving user experience. With reference to the first aspect, in some implementations of the first aspect, the method further includes: The first electronic device sends first information of the first application and second information of the second application to the second electronic device. The first information of the first application includes at least one type of information such as a name, an identifier ID, and an icon of the first application. The second information of the second application includes at least one type of information such as a name, an identifier ID, and an icon of the second application. After receiving the first information of the first application and the second information of the second application, the second electronic device automatically displays a third interface. The third interface includes the first information of the first application and the second information of the second application. Alternatively, after detecting a second operation of a user, the second electronic device displays the third interface based on the first information of the first application and the second information of the second application.

It should be understood that an example in which the mobile phone establishes a connection to the PC is used. After the mobile phone establishes a connection to the PC, the mobile phone may send information about all installed applications to the PC, and the PC directly automatically displays the applications of the mobile phone.

Alternatively, when tapping/clicking an EMUJI desktop menu in a menu window on the PC, the user may trigger the PC to send an application obtaining request to the mobile phone, to request to obtain application information of the mobile phone, for example, the first information of the first application and the second information of the second application.

The application information of the mobile phone herein may include at least one type of information such as names, identifiers (identification, ID), and icons of all applications of the mobile phone. After receiving the application information, the PC displays each application in a mobile phone window on the PC based on the name, the ID, and the icon of the application, to display all the applications of the mobile phone.

In the foregoing solution, all applications of the first electronic device can be displayed on the second electronic device.

With reference to the first aspect and the foregoing implementations, in some implementations of the first aspect, the first window is close to a right edge of the display area of the second electronic device.

With reference to the first aspect and the foregoing implementations, in some implementations of the first aspect, the second window is located on the left of the first window, and does not overlap the first window.

In the foregoing solution, a mobile phone window can be prevented from shielding an original application program (for example, My Computer or Recycle Bin) of the PC displayed in an interface of the PC, and the mobile phone window can be prevented from shielding a shortcut menu option such as an input method control menu, a time and date setting menu, or power management of the PC displayed in a lower-right corner area in the interface of the PC.

With reference to the first aspect and the foregoing implementations, in some implementations of the first aspect, the second window is located at an upper layer of the first window.

Optionally, in some possible implementations, the location information of the first window may further include display level information of the first window, the location information of the second window further includes display level information of the second window, and the second window is displayed at an upper level of the first window. In other words, the display level information of the first window is sent by the first electronic device to the second electronic device, and the second electronic device determines, based on the display level information of the first window, a layer at which the first window should be displayed.

With reference to the first aspect and the foregoing implementations, in some implementations of the first aspect, the location information of the first window includes coordinate information of a first vertex of the first window, length information of the first window, and width information of the first window; or the location information of the first window includes coordinate information of four vertices of the first window. Similarly, the location information of the second window is similar to the location information of the first window. Specifically, the location information of the second window includes coordinate information of a second vertex of the second window, length information of the second window, and width information of the second window; or the location information of the second window includes coordinate information of four vertices of the second window.

With reference to the first aspect and the foregoing implementations, in some implementations of the first aspect, size information of the first window is determined by the first electronic device based on the size information corresponding to the first interface. Before the first electronic device determines, based on the size information of the display area of the second electronic device and the size information corresponding to the first interface, the location information of the first window that is of the first interface and that is in the display area of the second electronic device, the method further includes: The first electronic device obtains size information of a display area of the first electronic device, and determines that the size information of the display area of the first electronic device is the size information corresponding to the first interface, or that the size information corresponding to the first interface is a product of the size information of the display area of the first electronic device and a first multiple. The first multiple is greater than 0 and is not equal to 1.

For example, when determining the size information of the first window, the first electronic device may determine the size information of the first window based on a size of the first interface displayed on the first electronic device. For example, a size of the first window is the same as the size of the first interface displayed on the first electronic device. Alternatively, the size of the first interface displayed on the first electronic device is scaled up or scaled down based on a specific proportion, to obtain the size information of the first window. In the method, it can be ensured that when content in the first interface is displayed in the first window of the second electronic device, a display effect similar to that obtained when the first electronic device is used is provided for the user, so that display is more natural, and user experience is improved.

With reference to the first aspect and the foregoing implementations, in some implementations of the first aspect, size information of the first window is determined by the first electronic device based on the size information corresponding to the first interface. Before the first electronic device determines, based on the size information of the display area of the second electronic device and the size information corresponding to the first interface, the location information of the first window that is of the first interface and that is in the display area of the second electronic device, the method further includes: The first electronic device obtains, from configuration information of the first application, size information existing when the first interface is displayed on the first electronic device, and determines, as the size information corresponding to the first interface, the size information existing when the first interface is displayed on the first electronic device. Alternatively, the first electronic device obtains, from a network device, size information existing when the first interface is displayed on the second electronic device, and determines, as the size information corresponding to the first interface, the size information existing when the first interface is displayed on the second electronic device.

For example, the first electronic device may obtain, in different manners, the size information of the first interface displayed on the first electronic device. For example, when the first application is installed, the first electronic device obtains the size information from the configuration information of the first application, that is, may locally query interface information of the first application on the first electronic device, or requests the network device to query interface information of the second electronic device, to obtain the size information of the first interface displayed on the first electronic device.

With reference to the first aspect and the foregoing implementations, in some implementations of the first aspect, the first window includes the first interface and a first menu bar; and/or the second window includes the second interface and a second menu bar.

With reference to the first aspect and the foregoing implementations, in some implementations of the first aspect, the second menu bar includes a close key. After the second electronic device displays the second interface in the second window, the method further includes: If the second electronic device detects an operation performed by the user on the close key, the second electronic device closes the second window, and sends an instruction for closing the second application to the first electronic device. The first electronic device closes the second application based on the instruction for closing the second application. With reference to the first aspect and the foregoing implementations, in some implementations of the first aspect, after the second electronic device displays the second interface in the second window, the method further includes: If the second electronic device detects an operation of selecting the first window by the user, the second electronic device switches the first window to an uppermost layer for display.

With reference to the first aspect and the foregoing implementations, in some implementations of the first aspect, the second menu bar includes a maximize key. After the second electronic device displays the second interface in the second window, the method further includes: If the second electronic device detects an operation performed by the user on the maximize key, the second electronic device displays the second window in full screen.

With reference to the first aspect and the foregoing implementations, in some implementations of the first aspect, after the second electronic device displays the second interface in the second window, the method further includes: If the first electronic device detects an instruction of the user for closing the second application, the first electronic device closes the second application, and notifies the second electronic device to close the second window. The second electronic device closes the second window based on the notification of the first electronic device.

With reference to the first aspect and the foregoing implementations, in some implementations of the first aspect, the method further includes: The second electronic device detects an operation of selecting and dragging the second window, where the second window moves from a first location to a second location. The second electronic device sends information about the second location and information about the second application to the first electronic device. The first electronic device receives the information about the second location and the information about the second application that are sent by the second electronic device, determines the second application based on the information about the second application, and determines a display location of display content in the second interface based on the information about the second location.

In the foregoing technical solution, a window that is of each application and that is displayed on the PC may receive an operation of the user, for example, an operation of closing, moving, scaling, maximizing, and minimizing the window. In addition, the user may perform an operation on each mobile phone application in a window that corresponds to the mobile phone application and that is displayed on the PC. For example, the user taps/clicks a control such as Play and Next in a window that is of a music application and that is on the PC, to control a music play process. In addition, an operation performed by the user on the mobile phone application on the PC does not affect use of another function of the user on the mobile phone, for example, the foregoing scenario in which the user plays music by using the mobile phone and views a video by using the PC at the same time. The user may perform an operation on any control of a mobile phone application in a window that is of the application and that is displayed on the PC. The operation may be transferred back to the mobile phone, and the mobile phone executes an operation result, and transfers an execution result to the PC, so that the operation result executed by the mobile phone can be synchronized in the window that is of the application and that is on the PC, thereby improving use efficiency and use experience of the mobile phone application.

With reference to the first aspect and the foregoing implementations, in some implementations of the first aspect, if the first application is an audio play application, and the second application is also an audio play application, after the first electronic device starts the second application, the method further includes: The first electronic device sends audio data of the second application to the second electronic device. The second electronic device plays the audio data of the second application.

In a possible case, when the user plays music on the mobile phone, a window corresponding to the music application can be displayed on the PC. In addition, the mobile phone sends audio data to the PC, and the PC plays the audio data.

Optionally, the music audio may be actually played on a device in which the music application is started. Specifically, if the user taps the music application on the mobile phone, a device that actually plays the music audio is the mobile phone. The user plays the music in a mobile phone window on the PC by using the music application. In this case, the device that actually plays the music audio is the PC.

With reference to the first aspect and the foregoing implementations, in some implementations of the first aspect, that the first electronic device sends the location information of the first window and display content information of the first interface to the second electronic device includes: The first electronic device encodes the location information of the first window and the display content information of the first interface, to generate a first video stream, and sends the first video stream to the second electronic device. The second electronic device receives the first video stream sent by the first electronic device, and decodes the first video stream to obtain the location information of the first window and the display content information of the first interface. That the first electronic device sends the location information of the second window and display content information of the second interface to the second electronic device includes: The first electronic device encodes the location information of the second window and the display content information of the second interface, to generate a second video stream, and sends the second video stream to the second electronic device. The second electronic device receives the second video stream sent by the first electronic device, and decodes the second video stream to obtain the location information of the second window and the display content information of the second interface.

In a specific implementation process, a video stream transmission process may be used: The mobile phone encodes all information to be sent to the PC, to generate a video stream, for example, encodes interface content information of the music application and location information of the window that is of the music application and that is displayed on the PC, to generate a video stream, and sends the video stream to the PC. After receiving and decoding the video stream, the PC accurately displays interface content of the music application in the window of the music application.

In conclusion, in the multi-window display method provided in this embodiment of this application, an application program of the mobile phone can be displayed in a mobile phone window on the PC, or can be displayed in a menu list of the PC. When an application of the mobile phone is not installed on the PC, the application of the mobile phone can be tapped/clicked and run on the PC, and a function of the application can be used. The user can use the application of the mobile phone by using large-screen experience of the PC. In the method, system integration can be implemented between the mobile phone and the PC, so that the user can invoke an application installed on the mobile phone from a system menu of the PC.

In addition, in the method, a plurality of mobile phone applications can independently run in parallel on the PC at the same time. An independent window can be displayed on the PC for each application. A plurality of windows corresponding to a plurality of applications are displayed in an interface of the PC at the same time, and running a plurality of applications of the mobile phone does not affect use of another function of the user on the mobile phone. For example, when using a video application or a music application of the mobile phone on the PC, the user may send/receive an SMS message, make a call, or the like by using the mobile phone at the same time. Alternatively, the user may operate the mobile phone by using a peripheral input device such as a mouse or a keyboard, a use habit of the user is totally reserved, and there is no need to frequently switch between the two devices. An application of the mobile phone is run by using the mobile phone window of the PC, thereby improving efficiency of file query, sharing, and office, and improving user experience.

According to a second aspect, a multi-window display method is provided, applied to a system including a first electronic device and a second electronic device that communicate with each other, where the method includes: A first electronic device receives size information of a display area of the second electronic device. The first electronic device runs a first application, and displays a first interface of the first application. The first electronic device determines, based on the size information of the display area of the second electronic device and size information corresponding to the first interface, location information of a first window that is of the first interface and that is in the display area of the second electronic device. The first electronic device sends the location information of the first window and display content information of the first interface to the second electronic device. The first electronic device receives an instruction that is sent by the second electronic device and that is for starting a second application, and starts the second application. The first electronic device determines, based on the size information of the display area of the second electronic device and size information corresponding to a second interface of the second application, location information of a second window that is of the second interface and that is in the display area of the second electronic device.

The first window and the second window are different windows. The first electronic device sends the location information of the second window and display content information of the second interface to the second electronic device.

With reference to the second aspect, in some implementations of the second aspect, the method further includes: The first electronic device sends first information of the first application and second information of the second application to the second electronic device. The first information of the first application includes at least one type of information such as a name, an identifier ID, and an icon of the first application. The second information of the second application includes at least one type of information such as a name, an identifier ID, and an icon of the second application.

With reference to the second aspect and the foregoing implementations, in some implementations of the second aspect, the first window is close to a right edge of the display area of the second electronic device.

With reference to the second aspect and the foregoing implementations, in some implementations of the second aspect, the second window is located on the left of the first window, and does not overlap the first window.

With reference to the second aspect and the foregoing implementations, in some implementations of the second aspect, the second window is located at an upper layer of the first window.

With reference to the second aspect and the foregoing implementations, in some implementations of the second aspect, the location information of the first window includes coordinate information of a first vertex of the first window, length information of the first window, and width information of the first window; or the location information of the first window includes coordinate information of four vertices of the first window.

With reference to the second aspect and the foregoing implementations, in some implementations of the second aspect, size information of the first window is determined by the first electronic device based on the size information corresponding to the first interface. Before the first electronic device determines, based on the size information of the display area of the second electronic device and the size information corresponding to the first interface, the location information of the first window that is of the first interface and that is in the display area of the second electronic device, the method further includes: The first electronic device obtains size information of a display area of the first electronic device, and determines that the size information of the display area of the first electronic device is the size information corresponding to the first interface, or that the size information corresponding to the first interface is a product of the size information of the display area of the first electronic device and a first multiple. The first multiple is greater than 0 and is not equal to 1.

With reference to the second aspect and the foregoing implementations, in some implementations of the second aspect, size information of the first window is determined by the first electronic device based on the size information corresponding to the first interface. Before the first electronic device determines, based on the size information of the display area of the second electronic device and the size information corresponding to the first interface, the location information of the first window that is of the first interface and that is in the display area of the second electronic device, the method further includes: The first electronic device obtains, from configuration information of the first application, size information existing when the first interface is displayed on the first electronic device, and determines, as the size information corresponding to the first interface, the size information existing when the first interface is displayed on the first electronic device. Alternatively, the first electronic device obtains, from a network device, size information existing when the first interface is displayed on the second electronic device, and determines, as the size information corresponding to the first interface, the size information existing when the first interface is displayed on the second electronic device.

With reference to the second aspect and the foregoing implementations, in some implementations of the second aspect, the first window includes the first interface and a first menu bar; and/or the second window includes the second interface and a second menu bar.

With reference to the second aspect and the foregoing implementations, in some implementations of the second aspect, the second menu bar includes a close key, and the method further includes: The first electronic device receives an instruction that is sent by the second electronic device and that is for closing the second application, and if detecting an operation performed by a user on the close key, the second electronic device closes the second window, and sends the instruction for closing the second application to the first electronic device. The first electronic device closes the second application in response to the instruction for closing the second application.

With reference to the second aspect and the foregoing implementations, in some implementations of the second aspect, the method further includes: If the first electronic device detects an instruction of the user for closing the second application, the first electronic device closes the second application, and sends an instruction for closing the second window to the second electronic device.

With reference to the second aspect and the foregoing implementations, in some implementations of the second aspect, if the first application is an audio play application, and the second application is also an audio play application, after the first electronic device starts the second application, the method further includes: The first electronic device sends audio data of the second application to the second electronic device.

According to a third aspect, a multi-window display method is provided, applied to a system including a first electronic device and a second electronic device that communicate with each other, where the method includes: The second electronic device receives location information of a first window and display content information of a first interface that are sent by the first electronic device, where the first interface is a displayed interface of the first application run on the first electronic device. The second electronic device displays the first interface in the first window of a display area of the second electronic device based on the location information of the first window and the display content information of the first interface. If detecting a first operation, the second electronic device sends an instruction for starting a second application to the first electronic device in response to the first operation. The second electronic device receives location information of a second window and display content information of a second interface that are sent by the first electronic device, where the second interface is an interface of the second application, and the first window and the second window are different windows. The second electronic device displays the second interface in the second window of the display area of the second electronic device based on the location information of the second window and the display content information of the second interface.

With reference to the third aspect, in some implementations of the third aspect, the method further includes: The second electronic device receives first information of the first application and second information of the second application that are sent by the first electronic device. The first information of the first application includes at least one type of information such as a name, an identifier ID, and an icon of the first application. The second information of the second application includes at least one type of information such as a name, an identifier ID, and an icon of the second application. The second electronic device automatically displays a third interface, where the third interface includes the first information of the first application and the second information of the second application. Alternatively, after detecting a second operation of a user, the second electronic device displays the third interface based on the first information of the first application and the second information of the second application.

With reference to the third aspect and the foregoing implementations, in some implementations of the third aspect, the first window is close to a right edge of the display area of the second electronic device.

With reference to the third aspect and the foregoing implementations, in some implementations of the third aspect, the second window is located on the left of the first window, and does not overlap the first window.

With reference to the third aspect and the foregoing implementations, in some implementations of the third aspect, the second window is located at an upper layer of the first window.

With reference to the third aspect and the foregoing implementations, in some implementations of the third aspect, the location information of the first window includes coordinate information of a first vertex of the first window, length information of the first window, and width information of the first window; or the location information of the first window includes coordinate information of four vertices of the first window.

With reference to the third aspect and the foregoing implementations, in some implementations of the third aspect, size information of the first window is determined by the first electronic device based on size information corresponding to the first interface. The size information corresponding to the first interface is size information of a display area of the first electronic device, or the size information corresponding to the first interface is a product of size information of a display area of the first electronic device and a first multiple. The first multiple is greater than 0 and is not equal to 1.

With reference to the third aspect and the foregoing implementations, in some implementations of the third aspect, size information of the first window is determined by the first electronic device based on size information corresponding to the first interface. The size information corresponding to the first interface is size information existing when the first interface is displayed on the first electronic device, or the size information corresponding to the first interface is size information that is obtained by the first electronic device from a network device and that exists when the first interface is displayed on the second electronic device.

With reference to the third aspect and the foregoing implementations, in some implementations of the third aspect, the first window includes the first interface and a first menu bar; and/or the second window includes the second interface and a second menu bar.

With reference to the third aspect and the foregoing implementations, in some implementations of the third aspect, the second menu bar includes a close key. After the second electronic device displays the second interface in the second window, the method further includes: If the second electronic device detects an operation performed by the user on the close key, the second electronic device closes the second window, and sends an instruction for closing the second application to the first electronic device.

With reference to the third aspect and the foregoing implementations, in some implementations of the third aspect, after the second electronic device displays the second interface in the second window, the method further includes: If the second electronic device detects an operation of selecting the first window by the user, the second electronic device switches the first window to an uppermost layer for display.

With reference to the third aspect and the foregoing implementations, in some implementations of the third aspect, the second menu bar includes a maximize key. After the second electronic device displays the second interface in the second window, the method further includes: If the second electronic device detects an operation performed by the user on the maximize key, the second electronic device displays the second window in full screen.

With reference to the third aspect and the foregoing implementations, in some implementations of the third aspect, after the second electronic device displays the second interface in the second window, the method further includes: If the second electronic device receives an instruction that is sent by the first electronic device and that is for closing the second window, the second electronic device closes the second window in response to the instruction for closing the second window.

With reference to the third aspect and the foregoing implementations, in some implementations of the third aspect, if the first application is an audio play application, and the second application is also an audio play application, the method further includes: The second electronic device receives audio data that is of the second application and that is sent by the first electronic device, and plays the audio data of the second application.

According to a fourth aspect, a multi-window display method is provided, applied to a system including a first electronic device and a second electronic device that communicate with each other, where the method includes: The first electronic device runs a first application, and displays a first interface of the first application. The first electronic device sends size information corresponding to the first interface and display content information of the first interface to the second electronic device. The second electronic device determines location information of a first window based on size information of a display area of the second electronic device and the size information corresponding to the first interface, and displays the first interface in the first window based on the location information of the first window and the display content information of the first interface. If detecting a first operation, the second electronic device sends an instruction for starting a second application to the first electronic device in response to the first operation. The first electronic device starts the second application based on the instruction for starting the second application. The first electronic device sends size information corresponding to a second interface of the second application and display content information of the second interface to the second electronic device. The second electronic device determines location information of a second window based on the size information of the display area of the second electronic device and the size information corresponding to the second interface, and displays the second interface in the second window based on the location information of the second window and the display content information of the second interface. The first window and the second window are different windows.

It should be understood that the following is described in the foregoing aspects: The first electronic device sends the location information of the first window and the display content information of the first interface to the second electronic device, and the second electronic device displays the first window based on an indication of the first electronic device. Optionally, the first electronic device may not obtain the size information of the display area of the second electronic device, but sends only the display content information of the first interface of the first electronic device. The second electronic device determines the location information of the first window, and displays the first window. Similarly, display of the second window may also be determined by the second electronic device, and details are not described herein again.

In the foregoing solution, the second electronic device may determine display locations of the first window and the second window based on application use, interface content, and the like of the second electronic device, to be better adapted to a use process of the second electronic device, reduce impact on use of the second electronic device, and improve user experience.

According to a fifth aspect, this application provides an apparatus. The apparatus is included in an electronic device, and the apparatus has a function of implementing behavior of the electronic device in the foregoing aspects and the possible implementations of the foregoing aspects. The function may be implemented by hardware, or may be implemented by corresponding software executed by hardware. The hardware or the software includes one or more modules or units corresponding to the function, such as a display module or unit, a detection module or unit, or a processing module or unit.

According to a sixth aspect, this application provides an electronic device, including a touchscreen. The touchscreen includes a touch-sensitive surface, a display, a camera, one or more processors, a memory, a plurality of application programs, and one or more computer programs. The one or more computer programs are stored in the memory, and the one or more computer programs include an instruction. When the instruction is executed by the electronic device, the electronic device is enabled to perform the multi-window display method in any possible implementation of any one of the foregoing aspects.

According to a seventh aspect, this application provides an electronic device, including one or more processors and one or more memories. The one or more memories are coupled to the one or more processors. The one or more memories are configured to store computer program code. The computer program code includes a computer instruction. When the one or more processors execute the computer instruction, the electronic device is enabled to perform the multi-window display method in any possible implementation of any one of the foregoing aspects.

According to an eighth aspect, a system is provided, where the system includes a first electronic device and a second electronic device that perform the multi-window display method in any possible implementation of any one of the foregoing aspects.

According to a ninth aspect, this application provides a computer storage medium, including a computer instruction. When the computer instruction is run on an electronic device, the electronic device is enabled to perform the multi-window display method in any possible implementation of any one of the foregoing aspects.

According to a tenth aspect, this application provides a computer program product. When the computer program product is run on an electronic device, the electronic device is enabled to perform the multi-window display method in any possible implementation of any one of the foregoing aspects.

DESCRIPTION OF EMBODIMENTS

Figure 1:
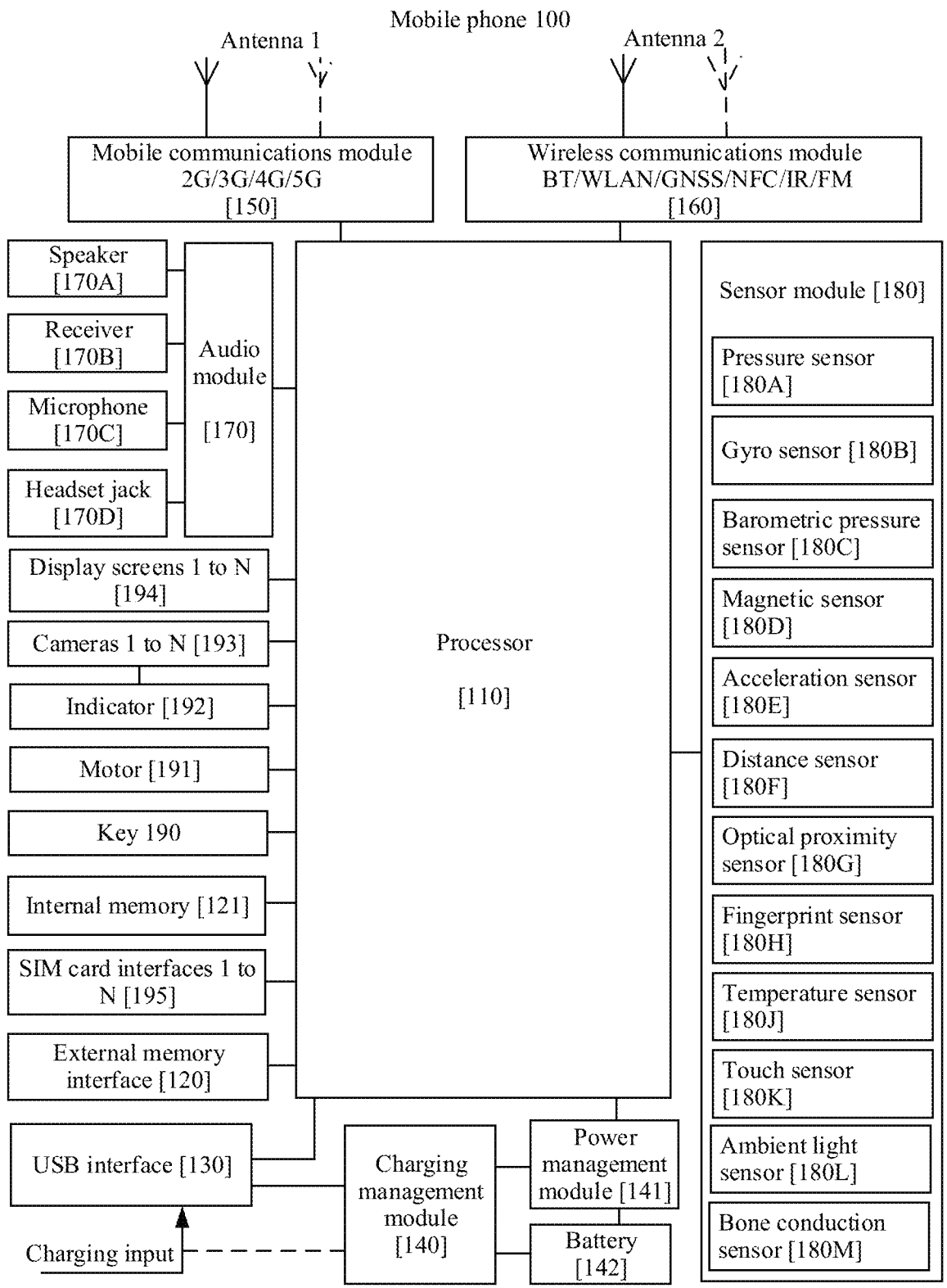
FIG. 1 is a schematic structural diagram of a first electronic device according to an embodiment of this application.

The following describes the technical solutions in the embodiments of this application with reference to the accompanying drawings in the embodiments of this application.

In descriptions of the embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions of the embodiments of this application, "a plurality of" means two or more than two.

In the following descriptions, terms "first" and "second" are only used for distinguishing. For example, "a first electronic device" and "a second electronic device" are only used to indicate different electronic devices, "a first window" and "a second window" are only used to indicate different display windows, and "a first operation" and "a second operation" are only used to indicate operations performed at different moments or for different purposes.

Embodiments of this application provide a multi-window display method, and the method may be applied to a system including two electronic devices that communicate with each other. In this application, to distinguish between the two electronic devices, the two electronic devices are respectively referred to as a first electronic device and a second electronic device, and the second electronic device may display an interface of the first electronic device. For example, the second electronic device displays a main interface of the first electronic device by using one window, or the second electronic device displays interfaces of a plurality of applications of the first electronic device by using a plurality of windows.

It should be understood that in the method, a plurality of windows of the first electronic device can be displayed on the second electronic device by using an application program. For example, the application program may be installed only on the second electronic device. Alternatively, the application program is installed on both the first electronic device and the second electronic device. Alternatively, the application program is embodied as a first application program on the first electronic device, and is embodied as a second application program on the second electronic device. The first application program is applicable to the first electronic device, and the second application program is applicable to the second electronic device. Alternatively, the first application program is program code that is preset on the first electronic device, and may have no corresponding desktop application icon. The second application program may be embodied as a plurality of possible forms such as a desktop application icon on the second electronic device, so that the second electronic device can display the main interface of the first electronic device by using one window or display the interfaces of the plurality of applications of the first electronic device by using a plurality of windows.

In the embodiments of this application, the first electronic device may be an electronic device such as a mobile phone, a smart terminal, or a wearable device. The second electronic device may be an electronic device with a display function such as a PC, a tablet computer, a mobile phone, a smart terminal, a vehicle-mounted device, an augmented reality (augmented reality, AR)/virtual reality (virtual reality, VR) device, a notebook computer, an ultra-mobile personal computer (ultra-mobile personal computer, UMPC), a netbook, a personal digital assistant (personal digital assistant, PDA), a display, or a television. No limitation is imposed on specific types of the first electronic device and the second electronic device in the embodiments of this application.

Optionally, the first electronic device and the second electronic device may be electronic devices of a same type or different types. In the embodiments of this application, in an example used for description, a mobile phone is used as the first electronic device, a PC is used as the second electronic device, and a plurality of windows of the mobile phone are displayed on the PC.

For example, FIG. 1 is a schematic structural diagram of a mobile phone 100 according to an embodiment of this application. The mobile phone 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a phone receiver 170B, a microphone 170C, a headset jack 170D, a sensor module 180, a key 190, a motor 191, an indicator 192, a camera 193, a display screen 194, a subscriber identity module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure illustrated in this embodiment of this application does not constitute a specific limitation on the mobile phone 100. In some other embodiments of this application, the mobile phone 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors. The controller may be a nerve center and a command center of the mobile phone 100. The controller may generate an operation control signal based on instruction operation code and a timing signal, and read an instruction and control execution of the instruction.

A memory may be further disposed in the processor 110, and is configured to store an instruction and data. In some embodiments, the memory in the processor 110 is a cache memory. The memory may store an instruction or data that is recently used or cyclically used by the processor 110. If the processor 110 needs to use the instruction or the data again, the processor 110 may directly invoke the instruction or the data from the memory, to avoid repeated access and reduce a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO)

interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (derail clock line, SCL). In some embodiments, the processor 110 may include a plurality of groups of I2C buses. The processor 110 may be coupled to the touch sensor 180K, a charger, a flash light, the camera 193, and the like by using different I2C bus interfaces. For example, the processor 110 may be coupled to the touch sensor 180K by using the I2C interface, so that the processor 110 communicates with the touch sensor 180K by using the I2C bus interface, to implement a touch function of the mobile phone 100.

The I2S interface may be used for audio communication. The PCM interface may also be used for audio communication, and samples, quantizes, and encodes an analog signal. The UART interface is a universal serial data bus, and is used for asynchronous communication. The bus may be a two-way communications bus. The bus converts to-be-transmitted data between serial communication and parallel communication. The MIPI interface may be configured to connect the processor 110 to peripheral components such as the display screen 194 and the camera 193. The MIPI interface includes a camera serial interface (camera serial interface, CSI), a display serial interface (display serial interface, DSI), and the like. The GPIO interface may be configured by using software. The GPIO interface may be configured as a control signal, or may be configured as a data signal. The USB interface 130 is an interface that conforms to a USB standard specification, and may be specifically a mini USB interface, a micro USB interface, a USB type C interface, or the like. The USB interface 130 may be configured to connect to another electronic device, for example, the USB interface may be used to connect to a PC.

It may be understood that an interface connection relationship between the modules illustrated in this embodiment of this application is merely an example for description, and does not constitute a limitation on the structure of the mobile phone 100. In some other embodiments of this application, the mobile phone 100 may alternatively use an interface connection manner different from that in the foregoing embodiment, or use a combination of a plurality of interface connection manners.

The charging management module 140 is configured to receive charging input from the charger.

A wireless communication function of the mobile phone 100 may be implemented by using the antenna 1, the antenna 2, the mobile communications module 150, the wireless communications module 160, the modem processor, the baseband processor, and the like. The antenna 1 and the antenna 2 are configured to transmit and receive an electromagnetic wave signal. The mobile communications module 150 can provide a solution for wireless communication including 2G/3G/4G/5G and the like to be applied to the mobile phone 100. The wireless communications module 160 can provide a solution for wireless communication including a wireless local area network (wireless local area networks, WLAN) (such as a wireless fidelity (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC), an infrared (infrared, IR) technology, and the like to be applied to the mobile phone 100. The wireless communications module 160 may be one or more components integrating at least one communications processor module. The wireless communications module 160 receives an electromagnetic wave by using the antenna 2, performs frequency modulation and filtering processing on an electromagnetic wave signal, and sends a processed signal to the processor 110. The wireless communications module 160 may further receive a to-be-sent signal from the processor 110, perform frequency modulation on the signal, amplify the signal, and convert the signal into an electromagnetic wave for radiation by using the antenna 2.

The mobile phone 100 implements a display function by using the GPU, the display screen 194, the application processor, and the like. The GPU is a microprocessor for image processing, and is connected to the display screen 194 and the application processor. The GPU is configured to perform mathematical and geometric calculation, and is configured to render an image. The processor 110 may include one or more GPUs that execute a program instruction to generate or change display information.

The display screen 194 is configured to display an image, a video, and the like. The display screen 194 includes a display panel. The display panel may use a liquid crystal display (liquid crystal display, LCD), an organic light-emitting diode (organic light-emitting diode, OLED), a passive-matrix organic light-emitting diode or an active-matrix organic light-emitting diode (active-matrix organic light emitting diode, AMOLED), a flexible light-emitting diode (flex light-emitting diode, FLED), a mini-LED, a micro-LED, a micro-OLED, a quantum dot light-emitting diode (quantum dot light emitting diodes, QLED), or the like. In some embodiments, the mobile phone 100 may include one or N display screens 194. N is a positive integer greater than 1.

The mobile phone 100 can implement a photographing function by using the ISP, the camera 193, the video codec, the GPU, the display screen 194, the application processor, and the like. The ISP is configured to process data fed back by the camera 193. The camera 193 is configured to capture a static image or a video. An optical image is generated for an object by using a lens, and is projected onto a photosensitive element. In some embodiments, the mobile phone 100 may include one or N cameras 193. N is a positive integer greater than 1.

The external memory interface 120 may be configured to connect to an external storage card such as a micro SD card, to extend a storage capability of the mobile phone 100. The internal memory 121 may be configured to store computer executable program code, and the executable program code includes an instruction. The processor 110 runs the instruction stored in the internal memory 121 to execute various function applications of the mobile phone 100 and process data. The internal memory 121 may include a program storage area and a data storage area. The program storage area may store an operating system, an application program required by at least one function (such as a sound play function and an image display function), and the like. The data storage area may store data (such as audio data and an address book) created in a process of using the mobile phone 100, and the like.

The mobile phone 100 can implement an audio function such as music play and recording by using the audio module 170, the speaker 170A, the phone receiver 170B, the microphone 170C, the headset jack 170D, the application processor, and the like.

In addition, the mobile phone 100 further includes a plurality of sensors, such as the plurality of sensors shown in FIG. 1. The pressure sensor 180A is configured to sense a pressure signal, and may convert the pressure signal into an electrical signal. The gyro sensor 180B may be configured to determine a movement posture of the mobile phone 100. The barometric pressure sensor 180C is configured to measure barometric pressure. The magnetic sensor 180D includes a Hall sensor. The acceleration sensor 180E may detect an acceleration value in each direction (generally, three axes) of the mobile phone 100. When the mobile phone 100 is static, the acceleration sensor 180E may detect a value and a direction of gravity, and may be further configured to recognize a posture of the mobile phone 100, and is applied to an application such as switching between landscape orientation and vertical orientation and a pedometer. The distance sensor 180F is configured to measure a distance. The optical proximity sensor 180G may include, for example, a light-emitting diode (LED) and an optical detector such as a photodiode. The ambient light sensor 180L is configured to sense ambient light brightness. The fingerprint sensor 180H is configured to collect a fingerprint. The temperature sensor 180J is configured to detect a temperature. The touch sensor 180K is also referred to as a "touch panel". The touch sensor 180K may be disposed in the display screen 194, and the touch sensor 180K and the display screen 194 constitute a touchscreen that is also referred to as a "touchscreen".

The touch sensor 180K is configured to detect a touch operation on or near the touch sensor 180K. The touch sensor may transfer the detected touch operation to the application processor to determine a type of a touch event. Visual output related to the touch operation may be provided by using the display screen 194. In some other embodiments, the touch sensor 180K may be disposed on a surface of the mobile phone 100 at a location different from that in the display screen 194. The bone conduction sensor 180M may obtain a vibration signal. The key 190 includes a power key, a volume key, and the like. The key 190 may be a mechanical key, or may be a touch key. The mobile phone 100 may receive key input, and generate key signal input related to a user setting and function control of the mobile phone 100. The motor 191 may generate a vibration prompt. The indicator 192 may be an indicator light that may be configured to indicate a charging state and a power change, or may be configured to indicate a message, a missed call, a notification, and the like. The SIM card interface 195 is configured to connect to a SIM card.

Figure 2:
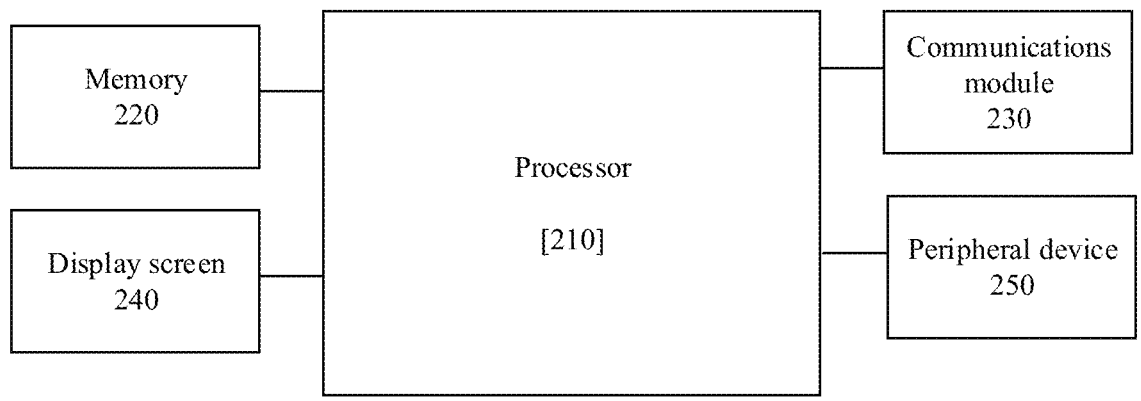
FIG. 2 is a schematic structural diagram of a second electronic device according to an embodiment of this application.

The foregoing describes a possible schematic structural diagram of hardware when the mobile phone 100 is used as the first electronic device. For example, FIG. 2 is a schematic structural diagram of a PC 200 according to an embodiment of this application. As a second electronic device, the PC 200 may include a processor 210, a memory 220, a communications module 230, a display screen 240, and the like.

It may be understood that the structure of the PC 200 shown in this embodiment of this application does not constitute a specific limitation on the PC 200. In some other embodiments of this application, the PC 200 may include more or fewer components than those shown in the figure, or combine some components, or split some components, or have different component arrangements. The components shown in the figure may be implemented by hardware, software, or a combination of software and hardware.

The processor 210 may include one or more processing units, and the processor 210 may be configured to control and manage an action of the PC 200. The memory 220 is configured to store program code and data. The communications module 230 may be used for communication between the internal modules of the PC 200, communication between the PC 200 and another external device, or the like. For example, if the PC 200 communicates with another electronic device in a wired connection manner, the communications module 230 may include an interface such as a USB interface. For the USB interface, refer to the description of the USB interface 130 in FIG. 1. Alternatively, the communications module 230 may include an audio component, a radio frequency circuit, a Bluetooth chip, a wireless fidelity (wireless fidelity, Wi-Fi) chip, a near field communication (near-field communication, NFC) module, and the like, and may implement interaction between the PC 200 and another electronic device. The display screen 240 is configured to display an image, a video, and the like. Optionally, the PC 200 may further include a peripheral device 250 such as a mouse, a keyboard, a speaker, and a microphone.

In this embodiment of this application, the processor 210 may execute a computer executable instruction stored in the memory 220, so that the PC 200 and a mobile phone 100 can form a system including electronic devices that communicate with each other, thereby displaying a plurality of windows of the mobile phone 100 by using the display screen 240 of the PC 200.

Figures 3A, 3B:
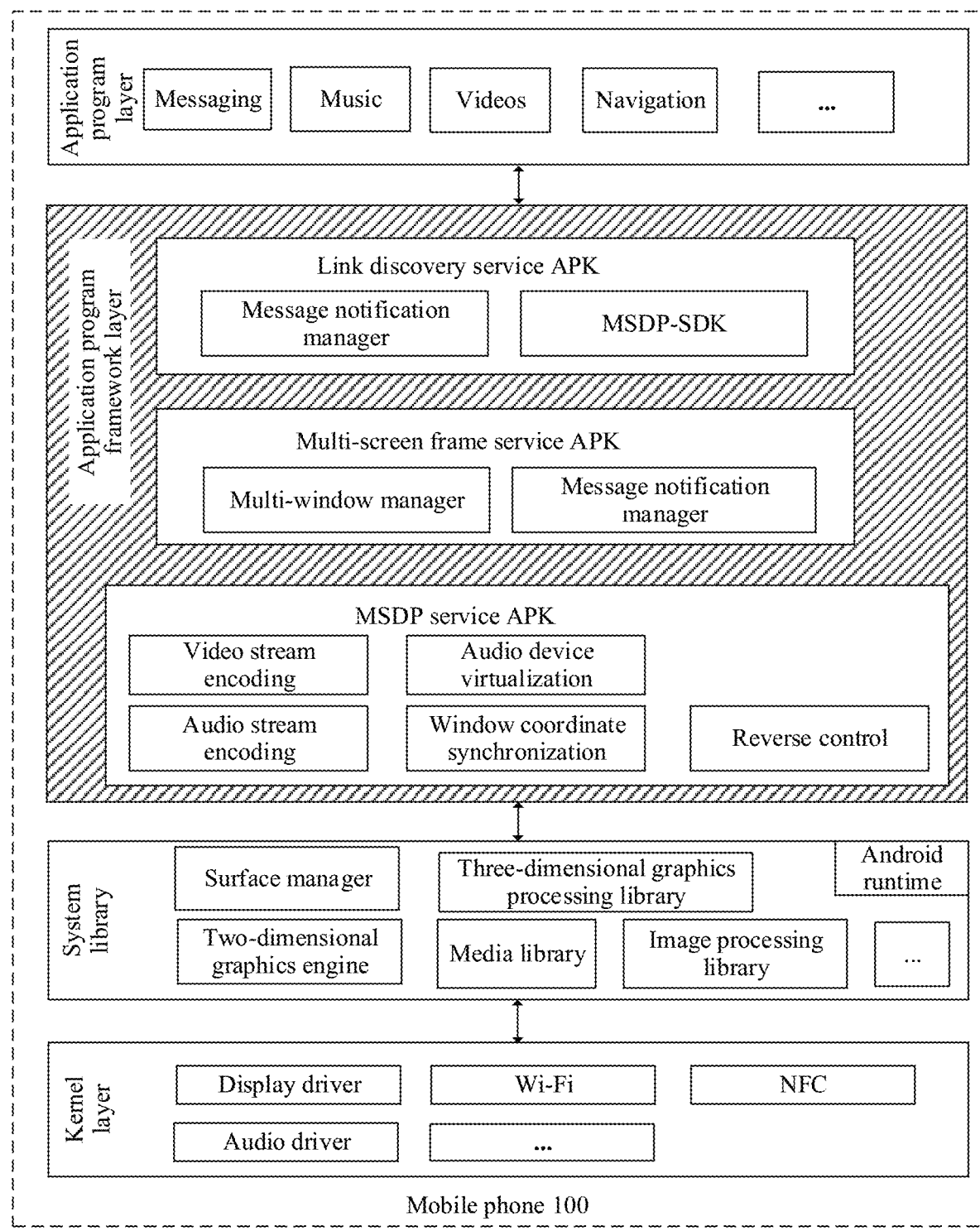
FIG. 3A and FIG. 3B are a structural block diagram of software of a mobile phone and a PC according to an embodiment of this application.
Figure 3B:
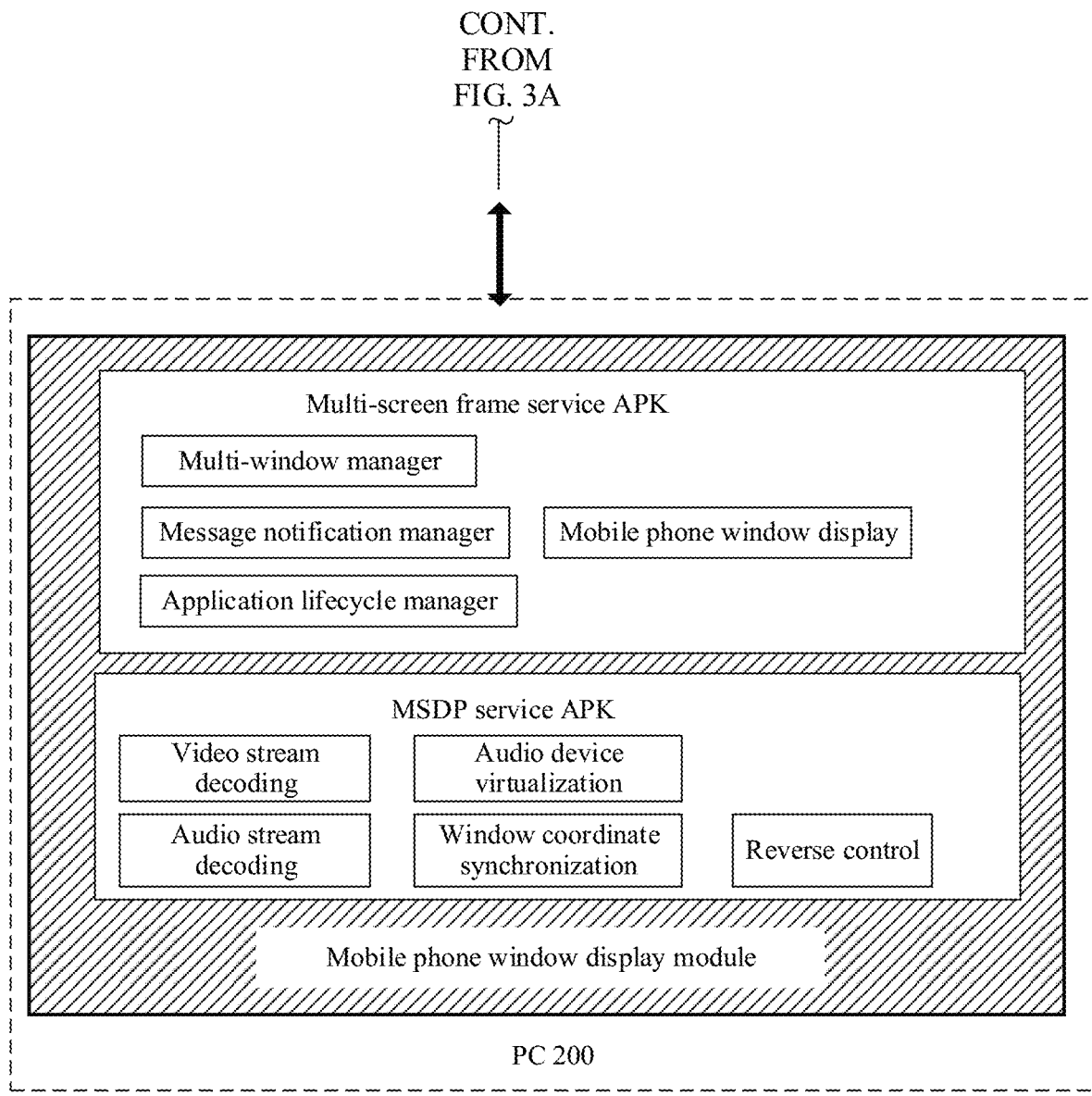

FIG. 3A and FIG. 3B are a structural block diagram of software of a mobile phone 100 and a PC 200 according to an embodiment of this application. The block diagram includes a software structure of the mobile phone 100 and a software structure of a mobile phone window display module of the PC 200.

The software structure of the mobile phone 100 may use a layered architecture, an event driven architecture, a micro kernel architecture, a micro service architecture, or a cloud architecture. In this embodiment of this application, an Android system with a layered architecture is used as an example to describe the software structure of the mobile phone 100. For the software structure of the mobile phone 100, the Android system is used as an example. In the layered structure, software is divided into several layers, and each layer has a clear role and task. The layers communicate with each other by using a software interface. In some embodiments, the Android system includes an application program (application, APP) layer, an application program framework (framework) layer, a system library, and a kernel layer from top to bottom. The application program layer may include a series of application program packages. For example, in the mobile phone 100 shown in FIG. 3A, the application program layer may include an application program such as messaging, music, videos, and navigation. This is not limited in this embodiment of this application.

The application program framework layer may include a plurality of service programs or some predefined functions. The application program framework layer provides an application programming interface (application programming interface, API) and a programming framework for an application program at the application program layer.

In this embodiment of this application, as shown in FIG. 3A, an application program framework layer may include a link discovery service Android package (Android package, APK), a multi-screen framework service APK, and a multicast source discovery protocol (multicast source discovery protocol, MSDP) service APK.

The link discovery service APK is used to discover the PC 200, and is connected to the PC 200. The link discovery service APK may include a software development kit (software development kit, SDK) that implements the function. The SDK may provide some files of an application programming interface (application programming interface, API) for a program design language, or may implement communication between hardware modules. For example, the MSDP-SDK shown in FIG. 3A may provide an interface for an MSDP service to notify a data transmission path, to implement a process of transmitting a video stream for the MSDP service.

In this embodiment of this application, the mobile phone 100 and the PC 200 may communicate with each other in a plurality of different manners, for example, communicate with each other in a connection manner or by using a future communications technology, to transmit data. The connection between the mobile phone 100 and the PC 200 may include a plurality of different connection manners such as a wired connection manner or a wireless connection manner. For example, a wired connection between the mobile phone 100 and the PC 200 may be established by using a USB data cable. A wireless connection between the mobile phone 100 and the PC 200 may be a Wi-Fi connection, a near connection established by using a "one hop" function and a near field communication (near field communication, NFC) function supported by the mobile phone 100 and the PC 200, a connection established by the mobile phone 100 and the PC 200 through Bluetooth code scanning, or the like. Data may be transmitted by using the future communications technology such as a 5G communications network by installing different applications or a same application on the mobile phones 100 and PC 200. In this embodiment of this application, an example in which an NFC connection is established between the mobile phone 100 and the PC 200 is used for detailed description. The connection manner between the mobile phone 100 and the PC 200 is not limited in this embodiment of this application.

For example, a connection is established between the mobile phone 100 and the PC 200 through NFC. The mobile phone 100 has an NFC function, and first enables the NFC function of the mobile phone 100. The link discovery service APK of the mobile phone 100 may be used to scan and discover another device that enables the NFC function in a specific range. If the PC 200 also enables the NFC function, when the mobile phone 100 is close to the PC 200, the link discovery service APK of the mobile phone 100 may send a connection request to an NFC function module of the PC 200, and the NFC function module of the PC 200 accepts the connection request, and establishes a path with the mobile phone 100, so that a process of establishing a connection between the mobile phone 100 and the PC 200 is completed. It should be understood that having the NFC function by an electronic device may be implemented by using an NFC chip included in the electronic device, or an NFC device may be externally connected to the electronic device to implement the NFC function by presetting an application program related to the NFC function on the electronic device. This is not limited in this embodiment of this application.

In a possible implementation, with development of communications technologies, a communication bandwidth and speed gradually increase, and data may also be transmitted between the mobile phone 100 and the PC 200 without establishing a near field communication connection. For example, with popularization of a high-speed communications manner such as a future 5th generation (5th generation, 5G) mobile communications system, for the mobile phone 100 and the PC 200, a window of the mobile phone 100 may be displayed on the PC 200 through 5G communication. For example, data is transmitted by using the 5G communications network by installing different applications or a same application on the mobile phone 100 and the PC 200. In this implementation, the link discovery service APK of the mobile phone 100 may not provide a function of discovering the PC 200 and establishing a connection to the PC 200, and the like. It should be understood that a communication manner between the mobile phone 100 and the PC 200 is not limited in this embodiment of this application. In a subsequent embodiment, an example in which an NFC connection is established between the mobile phone 100 and the PC 200 is used for detailed description.

After the mobile phone 100 establishes a connection to the PC 200, a multi-window manager in the multi-screen frame service APK is used to manage a window program of the mobile phone 100. For example, the multi-window manager may obtain a size of a to-be-displayed window on the mobile phone 100, and determine content of the to-be-displayed window. It should be understood that the to-be-displayed window of the mobile phone 100 may include a window that is being displayed in an interface of the mobile phone 100, and may further include a window of one or more application programs running in the background of the mobile phone 100. A message notification manager may enable an application program to display notification information in a status bar of the mobile phone 100, and may be used to convey a message of a notification type. A message displayed in the status bar may disappear automatically after a short stay without user interaction. The message displayed in the status bar may be used to notify a user that download is completed, and may be used to prompt for other message content. The message notification manager may further provide a notification in a form of a chart or a scroll bar text in the status bar at the top of the system, for example, a notification of an application program running in the background, and may further provide a notification in a form of a dialog window on a screen of the mobile phone 100. The message notification manager may further provide different types of notifications, such as an alert tone, a vibration of the mobile phone 100, and flashing of an indicator light.

The MSDP service APK is used to transmit data after the connection (for example, the NFC connection) is established between the mobile phone 100 and the PC 200, for example, transmit a video stream between the mobile phone 100 and the PC 200. The MSDP service APK may implement functions such as video stream encoding, audio stream encoding, window coordinate synchronization, audio device virtualization, and reverse control.

For example, the video stream encoding may implement encapsulation of to-be-transmitted video data into a packet that conforms to a data transmission protocol between the mobile phone 100 and the PC 200. The video stream packet may include information such as a type, a format, a sequence number, and a timestamp of transmission media, and whether additional data exists, to transmit a video stream in real time. Similarly, the audio stream encoding may implement encapsulation of to-be-transmitted audio data into a packet that conforms to the data transmission protocol between the mobile phone 100 and the PC 200, to transmit an audio stream in real time. The window coordinate synchronization may be used to determine coordinates of a to-be-displayed window of the mobile phone 100 on a display screen of the PC 200. The audio device virtualization may be used to create virtual audio for audio in the mobile phone 100, and then send the virtual audio to the PC 200, to play the audio on the PC 200. The reverse control may be used to synchronously perform a corresponding operation on the mobile phone 100 and the PC 200 based on an operation instruction transmitted between the mobile phone 100 and the PC 200. For example, the PC 200 displays a play window of a video application of the mobile phone 100. When the user pauses play on the PC 200, the pause operation may be transferred back to the mobile phone 100, and a reverse control module of the mobile phone 100 also controls the mobile phone 100 to pause play. Correspondingly, the reverse control may be further used to transfer an operation on the mobile phone 100 to the PC 200. It should be understood that, for different systems, there are different communication manners between the mobile phone 100 and the PC 200. Some or all of the software modules described above may participate in a multi-window display process of the PC 200 in this embodiment of this application.

In conclusion, the application program framework layer may implement functions such as link discovery and MSDP service invoking between the PC 200 and the mobile phone 100. In addition, a multi-screen framework service at the application program framework layer may further implement functions such as file dragging and sharing between the PC 200 and the mobile phone 100, display in a single window mode, and coordinated application lifecycle management. For file dragging and sharing between the PC 200 and the mobile phone 100 and display of one window of the mobile phone 100 by the PC 200, refer to an existing solution. Details are not described herein. Coordinated application lifecycle management is a software tool used to configure and manage an application program, and specifies a lifecycle of the application program.

The system library may include a plurality of function modules, for example, a surface manager (surface manager), a media library (media libraries), a three-dimensional graphics processing library (for example, OpenGL ES), and a 2D graphics engine (for example, SGL). The surface manager is used to manage a display subsystem of the mobile phone 100, and provide fusion of 2D and 3D layers for a plurality of application programs. The media library supports playback and recording in a plurality of commonly used audio and video formats, and static image files. The media library may support a plurality of audio and video encoding formats such as MPEG4, H.264, MP3, AAC, AMR, JPG, and PNG. The three-dimensional graphics processing library is used to implement drawing of three-dimensional graphics, image rendering, synthesis, layer processing, and the like. The 2D graphics engine is a drawing engine for 2D graphics.

An Android runtime (Android runtime) includes a kernel library and a virtual machine. The Android runtime is responsible for scheduling and management of the Android system.

The kernel layer is a layer between hardware and software. The kernel layer includes at least a display driver, an audio driver, and the like. In this embodiment of this application, when there is a wireless connection between the mobile phone 100 and the PC 200, the kernel layer of the mobile phone 100 may include a wireless fidelity (wireless fidelity, WIFI) module configured to establish a wireless connection. When there is an NFC connection between the mobile phone 100 and the PC 200, the kernel layer may further include a near field communication (near-field communication, NFC) module configured to implement a connection between the mobile phone 100 and the PC 200 through NFC. When data is transmitted between the mobile phone 100 and the PC 200 by using a communications network such as 5G, the kernel layer may not include a Wi-Fi module, an NFC module, or the like, or the kernel layer may include a Wi-Fi module, an NFC module, or the like that does not participate in the multi-window display process of the PC 200 in this embodiment of this application.

It should be understood that in addition to the plurality of layers shown in FIG. 3A and the plurality of function modules included at the layers, the mobile phone 100 may have different division manners or include more function modules. This is not limited in this embodiment of this application.

FIG. 3B further shows the mobile phone window display module of the PC 200. After the PC 200 is connected to the mobile phone 100, the mobile phone window display module is configured to display interface content of the mobile phone 100. It should be understood that the PC 200 may include a multi-layer architecture, such as a pre-research layer, a PC software layer, an operating system (operating system, OS) layer, and a basic read-only memory (read only memory, ROM) multi-screen frame layer. An executable file (executable file, exe) may be run at the PC software layer. For example, in this application, an exe program used to display a mobile phone window may be preset in the PC 200. The exe program for displaying a mobile phone window may be embodied in a form of an app on the PC 200, or the exe program for displaying a mobile phone window runs, so that the PC 200 has a function of displaying a window of the mobile phone 100. In this application, a function module provided by the PC 200 for displaying the window of the mobile phone 100 is referred to as the "mobile phone window display module". The following focuses on the mobile phone window display module of the PC 200 that is configured to display the window of the mobile phone 100.

The mobile phone window display module of the PC 200 may provide a function corresponding to a related service at the application program framework layer of the mobile phone 100, for example, provide a multi-screen framework service and an MSDP service. The MSDP service APK corresponds to the MSDP service of the mobile phone 100, and is used to transmit data after the PC 200 establishes a connection to the mobile phone 100. The MSDP service of the PC 200 may implement functions such as video stream decoding, audio stream decoding, window coordinate synchronization, audio device virtualization, and reverse control.

For example, in this application, the MSDP service APK of the PC 200 may receive a video stream sent by the mobile phone 100, and decode the video stream. The video stream decoding can be used to decapsulate an encapsulation packet received by the PC 200, and obtain complete video data obtained through decoding. The audio stream decoding may be used to decapsulate a packet received by the PC 200 to obtain audio data. The window coordinate synchronization may be used to determine, based on information included in the video stream, coordinates and an area that are on the display screen of the PC 200 and that are used to display a mobile phone window. The audio device virtualization is used to play the virtual audio by using an audio device of the PC 200 based on the received virtual audio sent by the mobile phone 100, to play the audio on the PC 200. The reverse control may be used to synchronously perform a corresponding operation on the mobile phone 100 and the PC 200 based on an operation instruction transmitted between the mobile phone 100 and the PC 200. For example, the PC 200 displays a play window of a video application of the mobile phone 100. When the user pauses play on the mobile phone 100, the pause operation may be transferred to the PC 200, and a reverse control module of the PC 200 obtains an instruction to also control the PC 200 to pause play. Correspondingly, the reverse control may be further used to transfer an operation on the PC 200 to the mobile phone 100.

The MSDP service APK obtains and parses a video frame, and transfers, to the multi-screen frame service APK, information that is about a mobile phone window and that is included in the video frame. The information about the mobile phone window may include coordinate information of the mobile phone window, display content information of the mobile phone window, and the like. The multi-screen frame service APK may include a multi-window manager, a message notification manager, a mobile phone window display, an application lifecycle manager, and the like. The multi-window manager may determine, based on the coordinate information of the mobile phone window, to display one or more windows of the mobile phone 100 on the display screen of the PC 200. The mobile phone window display performs display on the display screen of the PC 200 based on the display content information of the mobile phone window, and the mobile phone window display may be used to display one or more windows of the mobile phone 100. The message notification manager may be used to display notification information on the PC 200, for example, display the notification information in a manner of a message pop-up window, an alert tone, or the like. The application lifecycle manager is used to provide, for an application program developer, an interface for conveniently accessing application program information, start an application program by invoking a single application programming interface (application programmers interface, API), and process various runtime states for each running application program. The application lifecycle manager further maintains a program list for an application program installed in the system, and updates the list at any time when a monitored application program changes.

It should be understood that, after a link is established between the PC 200 and the mobile phone 100, a data transmission process may be performed. Transmitted data may include the video stream data described above, and may further include transmission of an intention-type instruction, for example, transmission of an operation instruction (for example, an instruction of an event such as starting, closing, moving, or scaling an application) such as a "touch event". The transmitted data may further include a parsable data format defined between the PC 200 and the mobile phone 100, and the like. This is not limited in this embodiment of this application.

It should be further understood that, in FIG. 3A and FIG. 3B, a module and a software architecture that participate in the multi-window display process are described by using an example in which a plurality of windows of the mobile phone 100 are displayed on the PC 200. In addition, the mobile phone 100 may be used as the second electronic device, and the MSDP service APK of the mobile phone 100 may provide a video stream decoding function. Alternatively, the PC 200 may be used as the first electronic device, and the MSDP service APK of the PC 200 may provide a video stream encoding function. This is not limited in this embodiment of this application.

In an existing process of displaying a mobile phone window, as described in the background, screen content and data are easily shared between a PC and a mobile phone by using screen sharing software. In addition, in another solution, the mobile phone may be connected to a large-screen device such as a PC, a display, or a television by using a data cable, so that the large-screen device can easily access the mobile phone. The user may use two screens to process a plurality of tasks at the same time. For example, the user may view content such as a video, an image, and a document on a larger display screen, and may continue to use the mobile phone to send/receive an SMS message, answer a call, or the like at the same time. In the method for displaying a mobile phone interface, the interface of the mobile phone needs to be projected to the large-screen device by using a connection of the data cable. In addition, in the method, system integration cannot be implemented between the mobile phone and the PC, and an application installed on the mobile phone cannot be invoked from a system menu of the PC.

For ease of understanding, the mobile phone 100 having the hardware structure shown in FIG. 1 and the software architecture shown in FIG. 3A and the PC 200 having the software structures shown in FIG. 2 and FIG. 3B are used as an example in the following embodiment to describe the multi-window display method provided in the embodiments of this application. The following specifically describes the multi-window display method with reference to the accompanying drawings and an application scenario.

Figure 4:
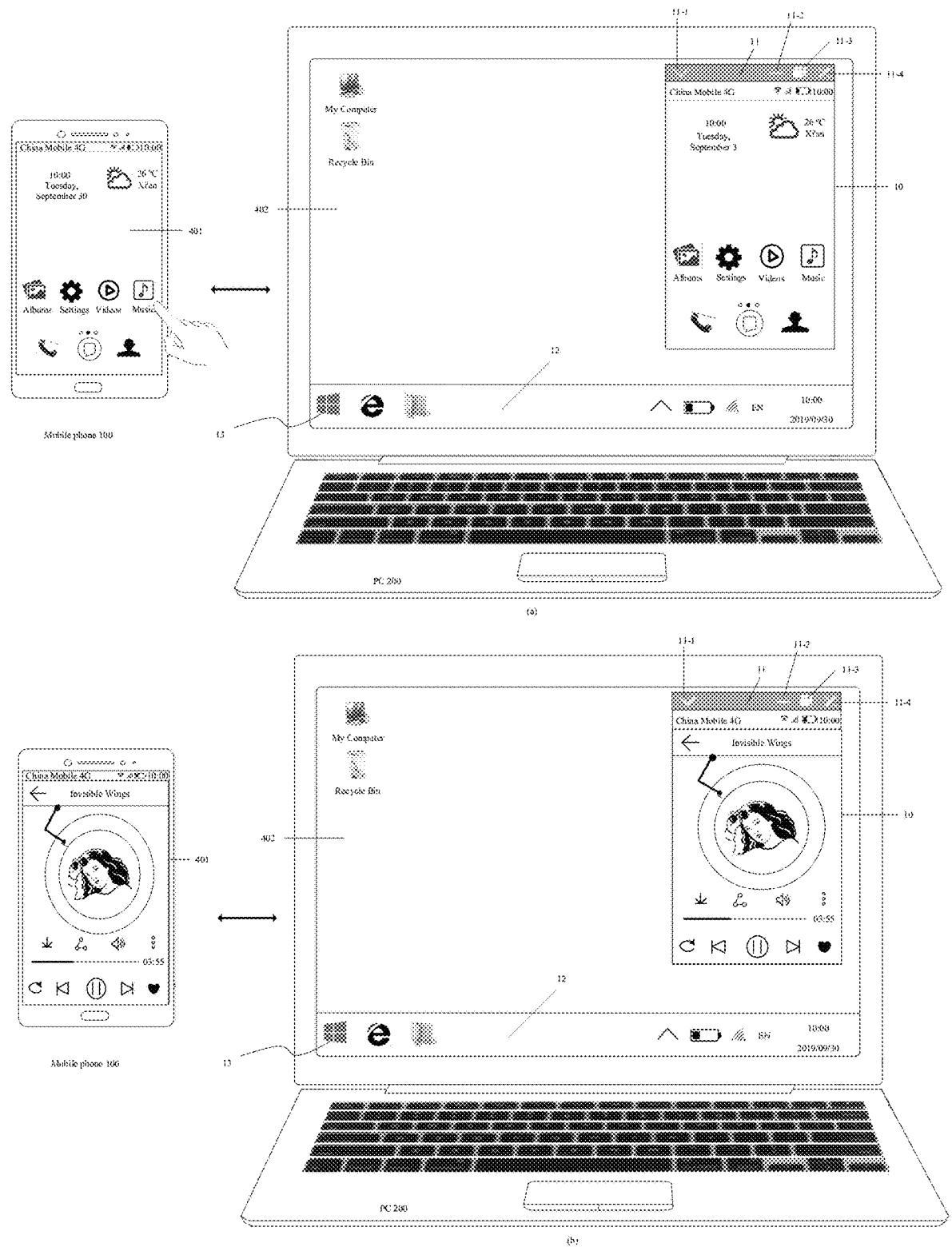
FIG. 4 is a schematic diagram of displaying a mobile phone interface by a PC according to an embodiment of this application.

FIG. 4 is a schematic diagram of displaying a mobile phone interface by a PC according to an embodiment of this application. As shown in (a) in FIG. 4, after a mobile phone is connected to the PC, a mobile phone window of the PC 200 may display a same interface as the mobile phone 100.

It should be understood that in this embodiment of this application, the communication manner described above may be used to transmit data between the mobile phone 100 and the PC 200, and details are not described herein again. (a) in FIG. 4 shows a home screen 401 of the unlocked mobile phone 100. A plurality of application programs (application, App) such as albums, settings, videos, and music are displayed on the home screen 401. It should be understood that the home screen 401 may further include more other application programs. This is not limited in this embodiment of this application.

(a) in FIG. 4 further shows a main interface 402 of the PC 200, and the main interface 402 includes a plurality of apps (such as My Computer and Recycle Bin) of the PC 200 and a mobile phone window 10. The mobile phone window 10 may be used to display interface content of the mobile phone 100. In addition, the mobile phone window 10 may further include a gray menu bar 11 shown in the figure. The gray menu bar 11 may include a hide to sidebar key 11-1, a hide to menu bar key 11-2, a maximize window key 11-3, and a close window key 11-4. Optionally, the hide to sidebar key 11-1 may be used to hide the mobile phone window 10 to a right frame of a display screen of the PC 200, and the hide to menu bar key 11-2 may be used to hide the mobile phone window 10 to a menu area 12.

It should be understood that the gray menu bar 11 may include some or all of the keys listed above, and may further include more function keys. This is not limited in this embodiment of this application. It should be further understood that the maximize window key 11-3 may be displayed in different forms based on an operation of the user, so that a function can be changed. For example, when the mobile phone window 10 is displayed as a small window, the user taps/clicks the maximize window key 11-3, and the mobile phone window 10 is maximized in response to the tapping/clicking operation of the user. In this case, the maximize key 11-3 may be changed to a minimize window key such as a minimize window key 11-5 shown in (b) in FIG. 7. The user may tap/click the minimize key 11-5, and the mobile phone window 10 is scaled down and displayed as the original small window in response to the tapping/clicking operation of the user.

In this embodiment of this application, an area including the gray menu bar 11 may be collectively referred to as the "mobile phone window 10". In FIG. 4, the main interface 402 may further include the menu area 12. The menu area 12 may include a start menu 13, a file management shortcut menu, a browser, an input method control menu, a time and date setting menu, and power management of the PC 200. This is not limited in this embodiment of this application.

After a connection is established between the mobile phone 100 and the PC 200, an interface currently displayed on the mobile phone 100 may be displayed in the mobile phone window 10 of the PC 200. As shown in (a) in FIG. 4, the user taps a music application on the home screen 401 of the mobile phone. Interfaces of the mobile phone 100 and the PC 200 may be shown in (b) in FIG. 4. The interface 401 of the mobile phone 100 displays an interface of the music application, and the mobile phone window 10 of the PC 200 also displays the interface of the music application, so that display content in the interface 401 of the mobile phone 100 and display content in the mobile phone window 10 of the PC 200 are consistent. Details are not described herein.

It should be understood that, the mobile phone window 10 is displayed on the PC 200 in the following manner: After a connection is established between the mobile phone 100 and the PC 200, the mobile phone window 10 may automatically pop up and be displayed in the main interface 402 of the PC; or the mobile phone window 10 may be displayed in the main interface 402 of the PC after an operation of the user. A display occasion and a display manner of the mobile phone window 10 are not limited in this embodiment of this application.

Figure 5A:
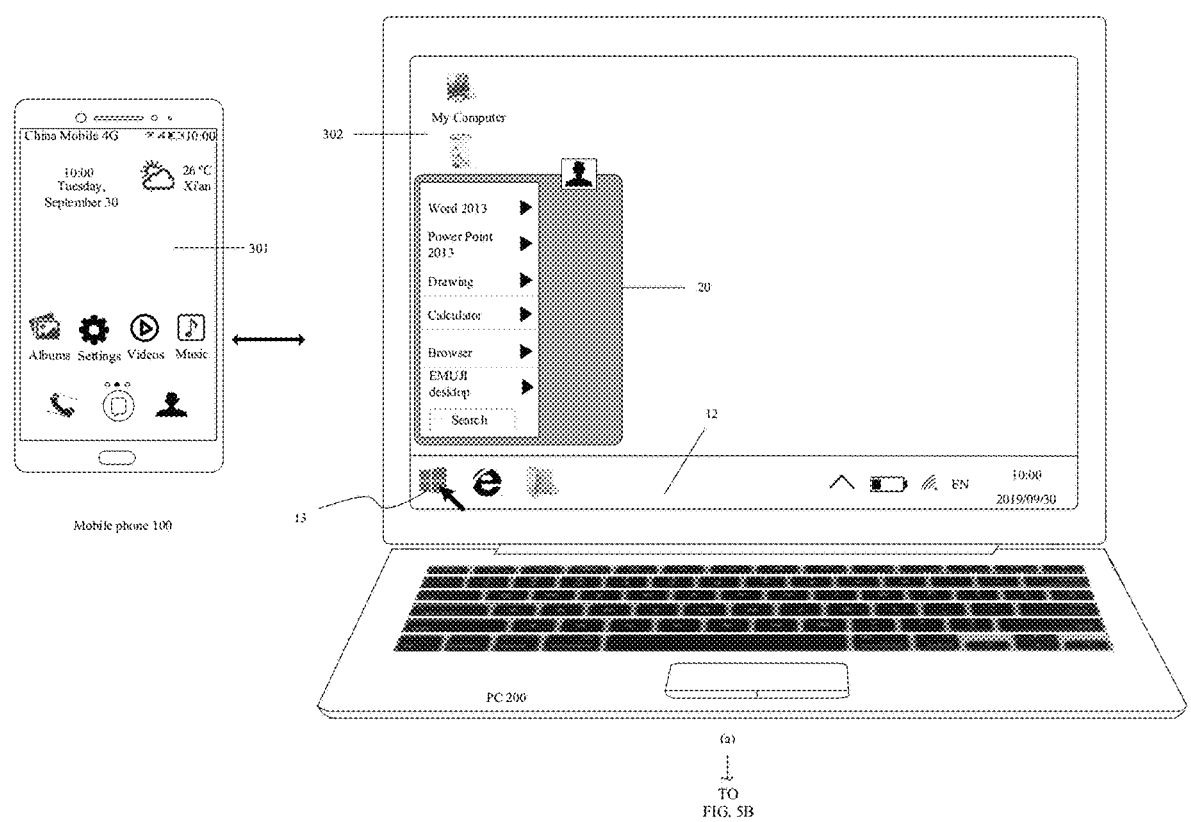
FIG. 5A, FIG. 5B, and FIG. 5C are another schematic diagram of displaying a mobile phone interface by a PC according to an embodiment of this application.
Figure 5B:
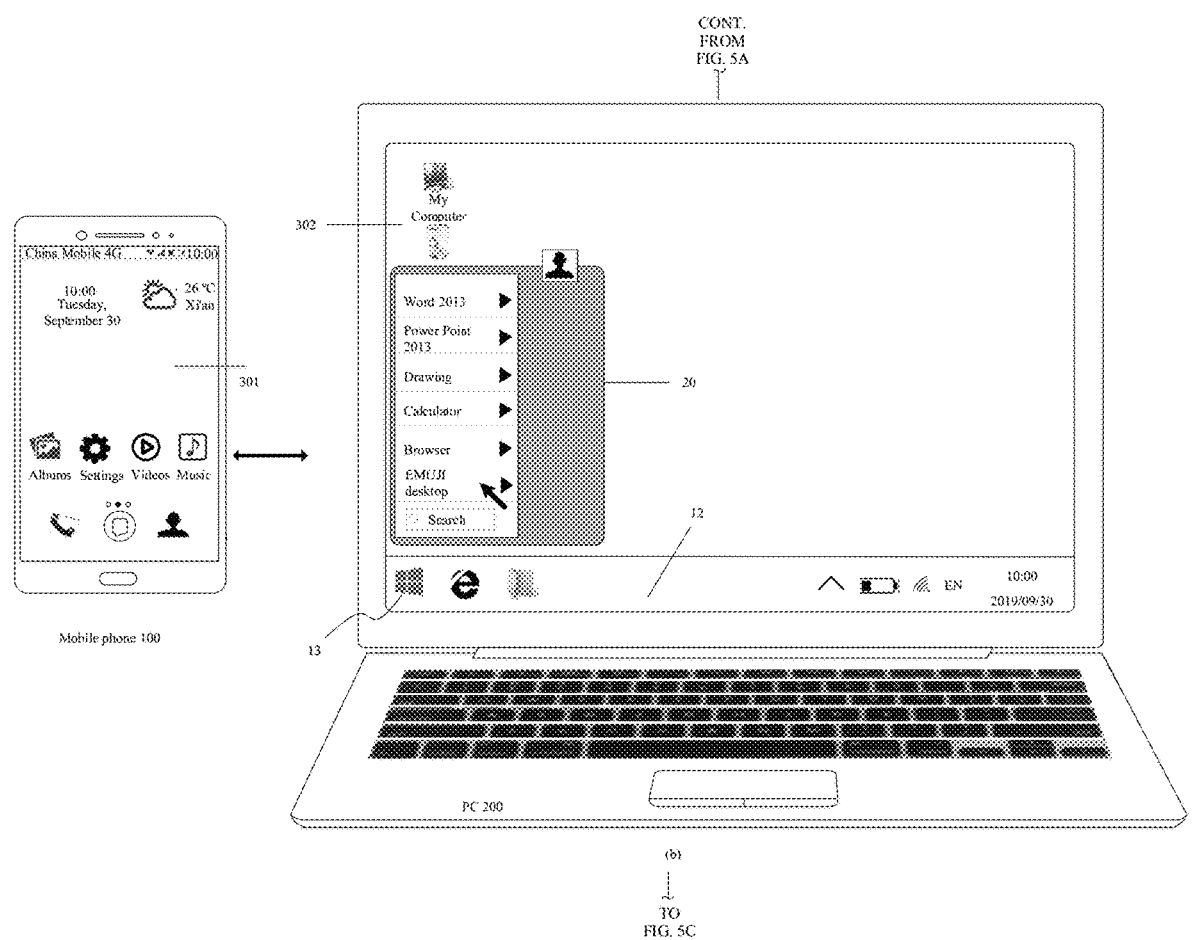
Figure 5C:
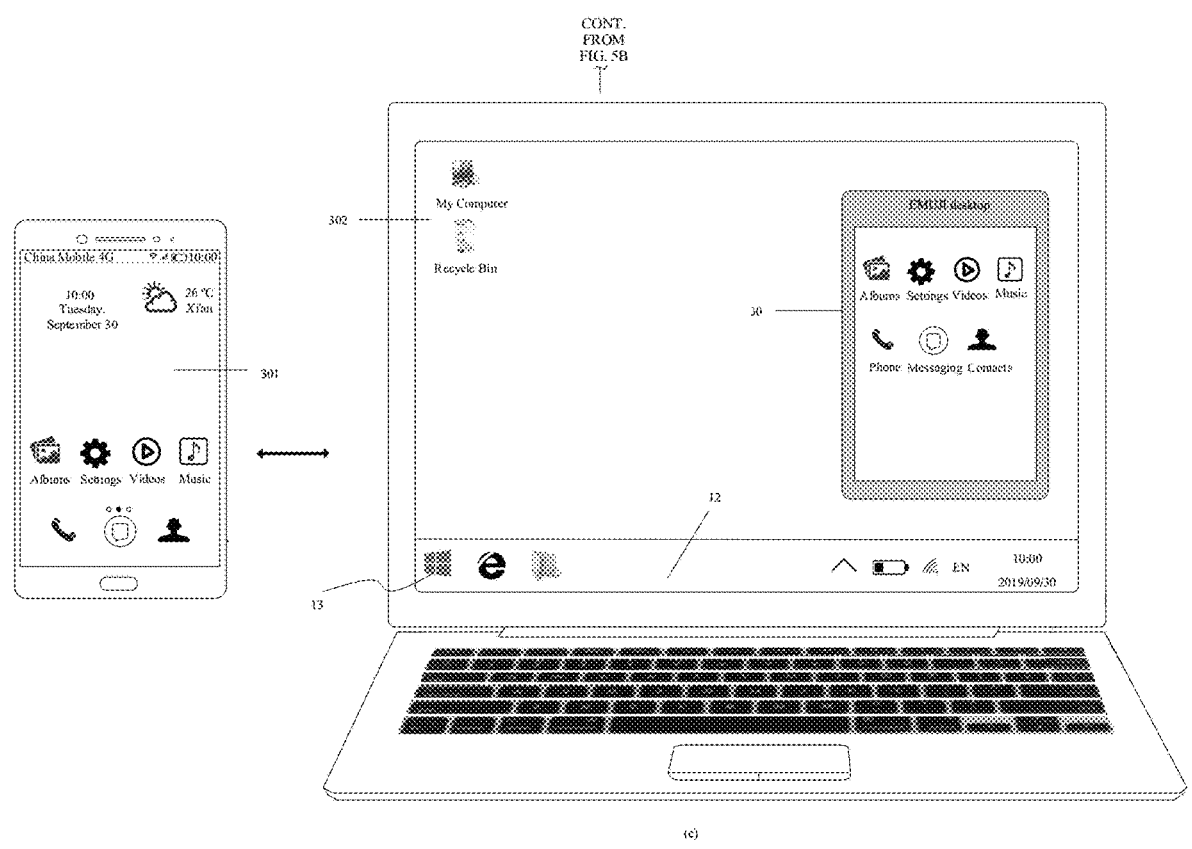

FIG. 5A, FIG. 5B, and FIG. 5C are another schematic diagram of displaying a mobile phone interface by a PC according to an embodiment of this application. In a possible implementation, after a connection is established between a mobile phone 100 and the PC 200, a user may perform an operation on the PC 200, and the mobile phone window 10 is displayed in a main interface 502 of the PC in response to the operation of the user.

For example, as shown in FIG. 5A, after a connection is established between the mobile phone 100 and the PC 200, the user may tap/click a start menu 13 on the PC 200, and a menu window 20 is displayed in the main interface 502 of the PC 200 in response to the tapping/clicking operation of the user. The menu window 20 includes a list of a plurality of applications of the PC, such as Word, Power Point, drawing, a calculator, or other office software, or another application such as a browser. In addition, if a related application used to display a plurality of windows of the mobile phone 100 is installed on the PC 200, the menu window 20 may further include a shortcut of the application. For example, the application may be an "EMUJI desktop (EMUJI desktop)", and the menu window 20 may include an icon of the EMUJI desktop.

It should be understood that the related application used to display a plurality of windows of the mobile phone 100 may be downloaded from an application store and installed on the PC 200. Details about a method for and a process of installing the application are not described in this embodiment of this application.

As shown in FIG. 5B, the user may tap/click an EMUJI desktop menu bar in the menu window 20, and a mobile phone application window 30 is displayed in the main interface 502 of the PC 200 in response to the tapping/clicking operation of the user, and all applications of the mobile phone 100 may be displayed in the mobile phone application window 30. Optionally, the mobile phone application window 30 may be shown in FIG. 5C, and an application program of the mobile phone 100 is displayed in a window of the EMUJI desktop. Alternatively, the mobile phone application window 30 may be displayed as the mobile phone window 10, and an application list of the mobile phone 100 is displayed in the mobile phone window 10. This is not limited in this embodiment of this application.

It should be understood that, after the mobile phone 100 establishes a connection to the PC 200, the mobile phone 100 may send information about all installed applications to the PC 200. Alternatively, when tapping/clicking the EMUJI desktop menu in the menu window 20, the user may trigger the PC 200 to send an application obtaining request to the mobile phone 100, to request to obtain application information of the mobile phone 100.

The application information herein may include information such as names, identifiers (identification, ID), and icons of all applications at the application program layer. After receiving the application information, the PC 200 displays each application in the mobile phone application window 30 based on the name, the ID, and the icon of the application, to display all the applications of the mobile phone 100. The display may be shown in FIG. 5C. It should be further understood that the identifier of the application may be a package name, the package name includes a string, and the PC 200 may determine a music application based on the package name.

Optionally, after the user taps/clicks the EMUJI desktop menu bar, as shown in FIG. 5A, the mobile phone window 10 pops up, and the mobile phone window 10 is consistent with an interface 501 of the mobile phone 100 in terms of display.

Alternatively, in a possible case, as shown in FIG. 5C, after the user taps/clicks the EMUJI desktop menu bar, the window 30 of the EMUJI desktop may pop up in the main interface 502 of the PC 200. All application programs installed on the mobile phone may be displayed in the window 30 of the EMUJI desktop, and the user may perform an operation of tapping/clicking any application program in the window 30 of the EMUJI desktop.

It should be understood that, in this embodiment of this application, the interface of the mobile phone 100 may be displayed in the interface of the PC 200 by using the mobile phone window 10 shown in FIG. 5A, FIG. 5B, and FIG. 5C, or by using the operation method described in FIG. 5A, FIG. 5B, and FIG. 5C: invoking an application (for example, the EMUJI desktop) from the start menu 13 of the PC 200, and then using the application to display the mobile phone window 10 or the window 30 that is of the EMUJI desktop and that includes all the application programs of the mobile phone 100. This is not limited in this embodiment of this application.

In this embodiment of this application, the interface of the mobile phone 100 may be displayed in the interface of the PC 200 based on a requirement of the user. When the user runs a plurality of applications of the mobile phone 100, a plurality of windows corresponding to different applications may be displayed in the main interface 402 of the PC 200.

FIG. 5A, FIG. 5B, and FIG. 5C are another schematic diagram of displaying a mobile phone interface by a PC according to an embodiment of this application. It should be understood that a user may start the application by performing a tapping operation on the mobile phone, or start the application by performing a tapping/clicking operation in a mobile phone window 10 of the PC. This is not limited in this embodiment of this application.

It should be further understood that the "tapping/clicking operations" that are performed by the user and that are described in this embodiment of this application may be different operations for different devices. For example, for the mobile phone, the user may run the music application by performing a touching and tapping operation. For the PC, the user may run the music application by performing a clicking operation or double-clicking operation by using a peripheral input device such as a mouse or a keyboard. Alternatively, if the PC is a device with a touchscreen, the user may run the music application through touching and tapping. This is not limited in this embodiment of this application.

After a connection is established between the mobile phone 100 and the PC 200, the user may tap the music application on a home screen 401 of the mobile phone 100. As shown in (a) in FIG. 6, a window 40 of the music application may automatically pop up on the PC 200 in response to the tapping operation of the user.

Optionally, the window 40 of the music application may be used to display a main interface of the music application.

Alternatively, the user may tap/click a music application 14 in the mobile phone window 10 of the PC 200, and a window 40 of the music application may automatically pop up in a main interface 402 of the PC 200 in response to the tapping/clicking operation of the user. This is not limited in this embodiment of this application.

In a possible implementation, when the user taps/clicks and runs the music application 14 in the mobile phone window 10 of the PC 200, the window 40 of the music application may directly pop up in the mobile phone window 10 of the PC 200 in response to the tapping/clicking operation of the user, and the original mobile phone window 10 may retain as the home screen of the mobile phone 100.

It should be understood that when the user taps/clicks and operates the music application in the mobile phone window 10 of the PC 200, display content in the interface of the mobile phone 100 is not limited in this embodiment of this application. For example, the mobile phone 100 may be in a screen-off state, or display an unlocked home screen, or is consistent with display content in the mobile phone window 10 of the PC 200.

In another possible implementation, when the user taps and runs the music application on the home screen 401 of the mobile phone 100, or when the user may tap/click the music application 14 in the mobile phone window 10 of the PC 200, the main interface of the music application may directly pop up and be displayed in the mobile phone window 10 of the PC 200 in response to the tapping/clicking operation of the user. As shown in (b) in FIG. 6, the user may select and drag the main interface of the music application, so that the window 40 of the music application reappears on the PC 200.

Figure 6:
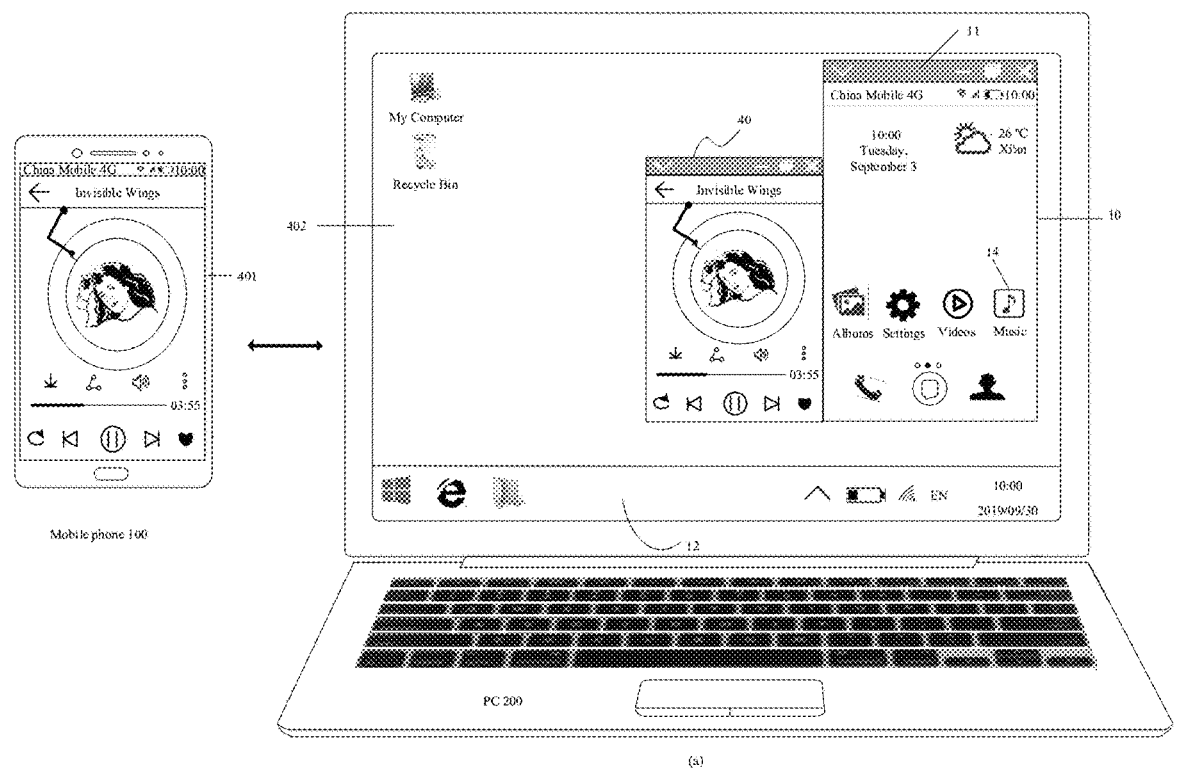
FIG. 6 is another schematic diagram of displaying a mobile phone interface by a PC according to an embodiment of this application.
Figure 6:
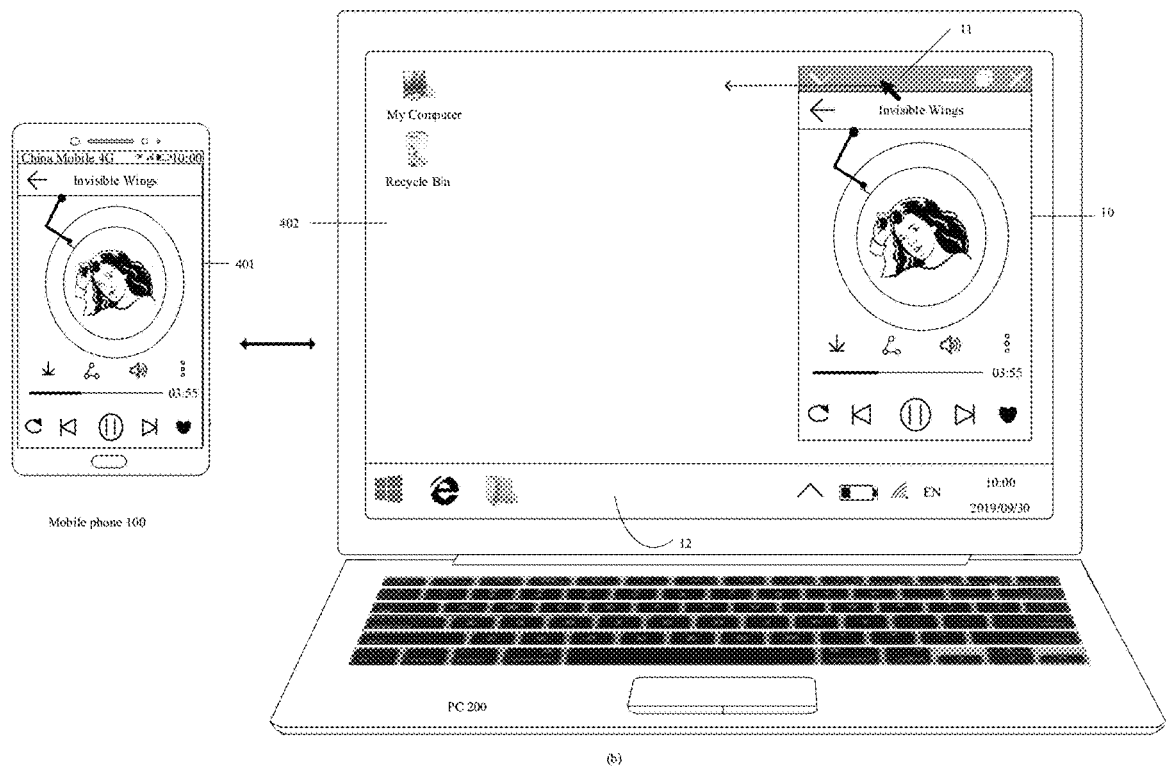

For example, for the operation shown in (b) in FIG. 6, after the main interface of the music application is displayed in the mobile phone window 10, the user may tap/click to select any location in the mobile phone window 10, and drag the mobile phone window 10 to any area outside the mobile phone window 10 in a direction shown by a dashed line. Therefore, the interface of the PC 200 is shown in (a) in FIG. 6, that is, the window 40 of the music application is independently displayed, and the home screen 401 of the mobile phone continues to be displayed in the mobile phone window 10.

Figure 7:
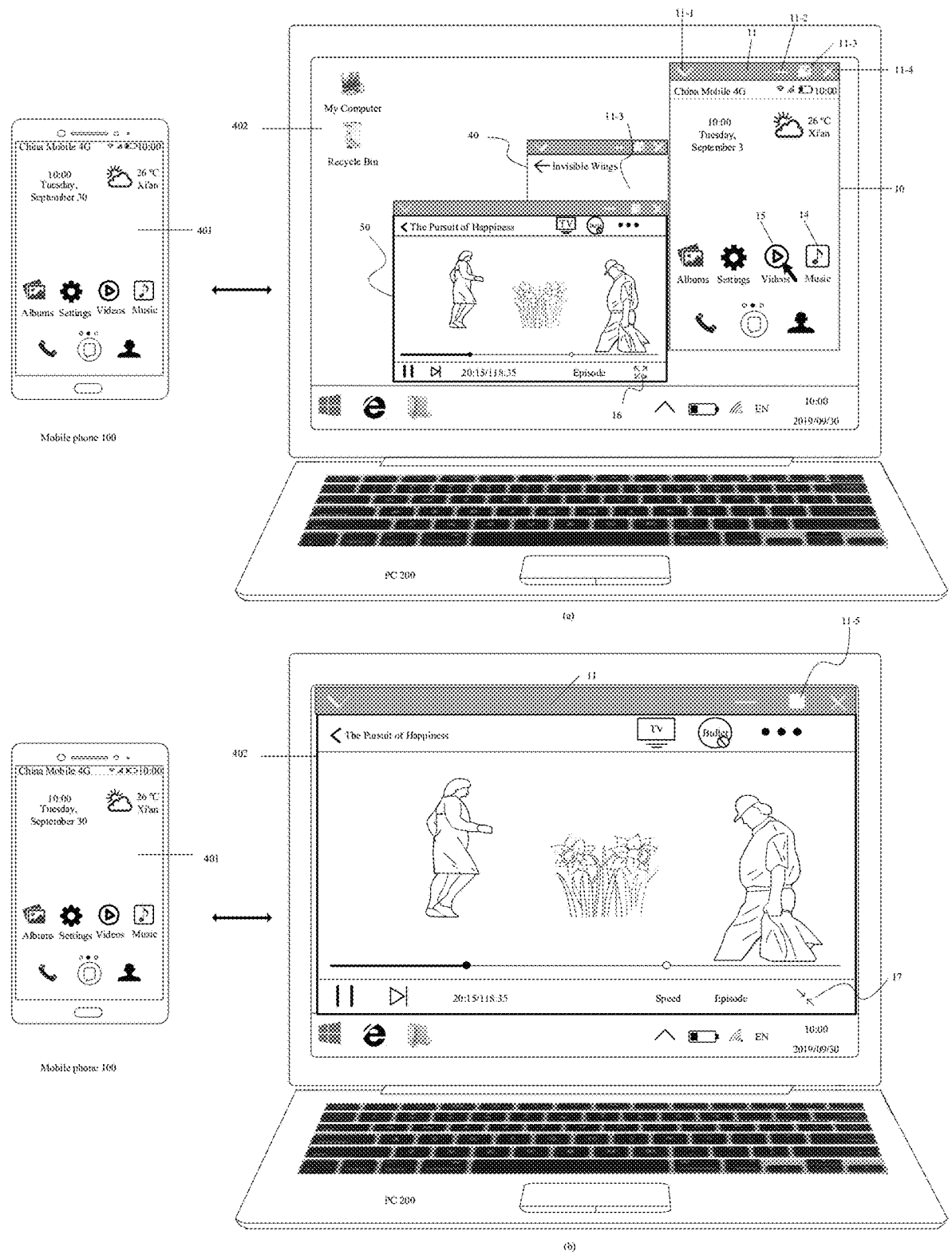
FIG. 7 is another schematic diagram of displaying a mobile phone interface by a PC according to an embodiment of this application.

FIG. 7 is another schematic diagram of displaying a mobile phone interface by a PC according to an embodiment of this application. When a user runs a plurality of applications, a corresponding window may be displayed on the PC 200 for each application.

As shown in (a) in FIG. 7, the user has run a music application on the PC 200, and a window 40 of the music application is displayed in a main interface 402 of the PC 200. For example, after the user taps and runs the music application on a mobile phone 100, the mobile phone may return to a home screen 401 of the mobile phone 100, and the music application may run in the background of the mobile phone 100. In this case, the user may further tap any other application on the home screen 401 of the mobile phone 100. Optionally, for example, the user may tap a video application 15 on the home screen 401 of the mobile phone 100, and a window 50 of the video application may further automatically pop up on the PC 200 in response to the tapping operation of the user. An interface of the mobile phone 100 is displayed as an interface of the video application, the user may return to the home screen 401 of the mobile phone 100, and the video application may run in the background of the mobile phone 100.

Alternatively, for the operation shown in (a) in FIG. 7, the user may tap/click a video application 15 in a mobile phone window 10 of the PC 200, and a window 50 of the video application may automatically pop up on the PC 200 in response to the tapping/clicking operation of the user. An interface of the mobile phone 100 may be displayed as the home screen 401, that is, any possible interface of the mobile phone 100 is displayed without an impact of the operation of the user. Any possible interface herein may be a lock screen interface, an interface of any application of the mobile phone that is used by the user, or the like.

It should be understood that the user may perform a related operation in a window that is of each application and that appears on the PC 200. For example, the window 50 of the video application may be a main interface of the video application, and includes a list of a plurality of videos. The user may tap/click a video, for example, the user taps/clicks "The Pursuit of Happiness". The window 50 of the video application may be displayed as the interface shown in (a) in FIG. 7, and the video is played by using the window 50 of the video application.

It should be further understood that this embodiment of this application sets no limitation on sizes and locations of windows that are of a plurality of applications and that are displayed on the PC 200. For example, for a process of determining a size and a location of a window that is of an application and that is displayed on the PC 200, refer to related descriptions in a subsequent step 804.

In a possible implementation, the user may select a window of an application, and drag the window to any location on a display screen of the PC 200. In addition, the user may perform a corresponding operation on a window of each application by using a key included in a gray menu bar 11, such as a hide to sidebar key 11-1, a hide to menu bar key 11-2, a maximize window key 11-3, and a close window key 11-4, or the user may drag a frame of the window 50 of the video application to scale down or scale up the window 50 of the video application. Details are not described herein again.

Optionally, when the user taps/clicks the close window key 11-4 in the gray menu bar 11 on the PC 200, the window may be closed on the PC 200 in response to the close operation of the user. An application that is of the mobile phone 100 and that corresponds to the window may run in the background, or an application corresponding to the window exits running and switches to a close state. This is not limited in this application.

For example, as shown in (a) in FIG. 7, when the user opens the video application on the PC 200 to display the window 50 of the video application, the user taps/clicks a close key in a gray menu bar in the window 50 of the video application, and the window may be closed on the PC 200 in response to the close operation of the user, and the video application of the mobile phone 100 may run in the background or exit running.

In another possible implementation, the user may maximize a window in different manners. For example, as shown in (a) in FIG. 7, the user taps/clicks a maximize window key 11-3 included in the gray menu bar 11 of the window 50 of the video application, to maximize the window 50 of the video application to a window that is displayed in full screen and that is shown in (b) in FIG. 7. Alternatively, the user taps/clicks a full-screen control 16 included in the window 50 of the video application, to maximize the window 50 of the video application to a window shown in (b) in FIG. 7. This is not limited in this embodiment of this application.

Correspondingly, when the window 50 of the video application is maximized to the window shown in (b) in FIG. 7, the user may tap/click a window scaling-down control 17 included in the gray menu bar 11, to restore the window 50 of the video application to a window that is not displayed in full screen and that is shown in (a) in FIG. 7. Alternatively, the user taps/clicks a minimize window key 11-5 included in the window 50 of the video application, to restore the window 50 of the video application to a window that is not displayed in full screen and that is shown in (a) in FIG. 7. This is not limited in this embodiment of this application.

In conclusion, in the multi-window display method provided in the embodiments of this application, an application program of the mobile phone 100 can be displayed in a mobile phone window on the PC 200, or can be displayed in a menu list of the PC 200. When an application of the mobile phone is not installed on the PC 200, the application of the mobile phone 100 can be tapped/clicked and run on the PC 200, and a function of the application can be used. The user can use the application of the mobile phone 100 by using large-screen experience of the PC 200. In the method, system integration can be implemented between the mobile phone and the PC, so that the user can invoke an application installed on the mobile phone from a system menu of the PC.

In addition, in the method, a plurality of mobile phone applications can independently run in parallel on the PC 200 at the same time. An independent window can be displayed on the PC 200 for each application. A plurality of windows corresponding to a plurality of applications are displayed in an interface of the PC 200 at the same time, and running a plurality of applications of the mobile phone 100 does not affect use of another function of the user on the mobile phone. For example, when using the video application or the music application of the mobile phone on the PC 200, the user may send/receive an SMS message, make a call, or the like by using the mobile phone at the same time. Alternatively, the user may operate the mobile phone by using a peripheral input device such as a mouse or a keyboard, a use habit of the user is totally reserved, and there is no need to frequently switch between the two devices. An application of the mobile phone 100 is run by using the mobile phone window of the PC 200, thereby improving efficiency of file query, sharing, and office, and improving user experience.

With reference to the foregoing embodiments and related accompanying drawings, the multi-window display method provided in the embodiments of this application may be applied to a system including two electronic devices that communicate with each other. For example, the system includes a first electronic device and a second electronic device that is configured to display an interface of the first electronic device. In the embodiments of this application, the mobile phone 100 serves as the first electronic device, and the PC 200 serves as the second electronic device. The PC 200 may display a plurality of windows of the mobile phone 100. With reference to FIG. 8 to FIG. 12, the following describes a specific implementation process of displaying a plurality of windows of the mobile phone 100 by the PC 200.

Figure 8:
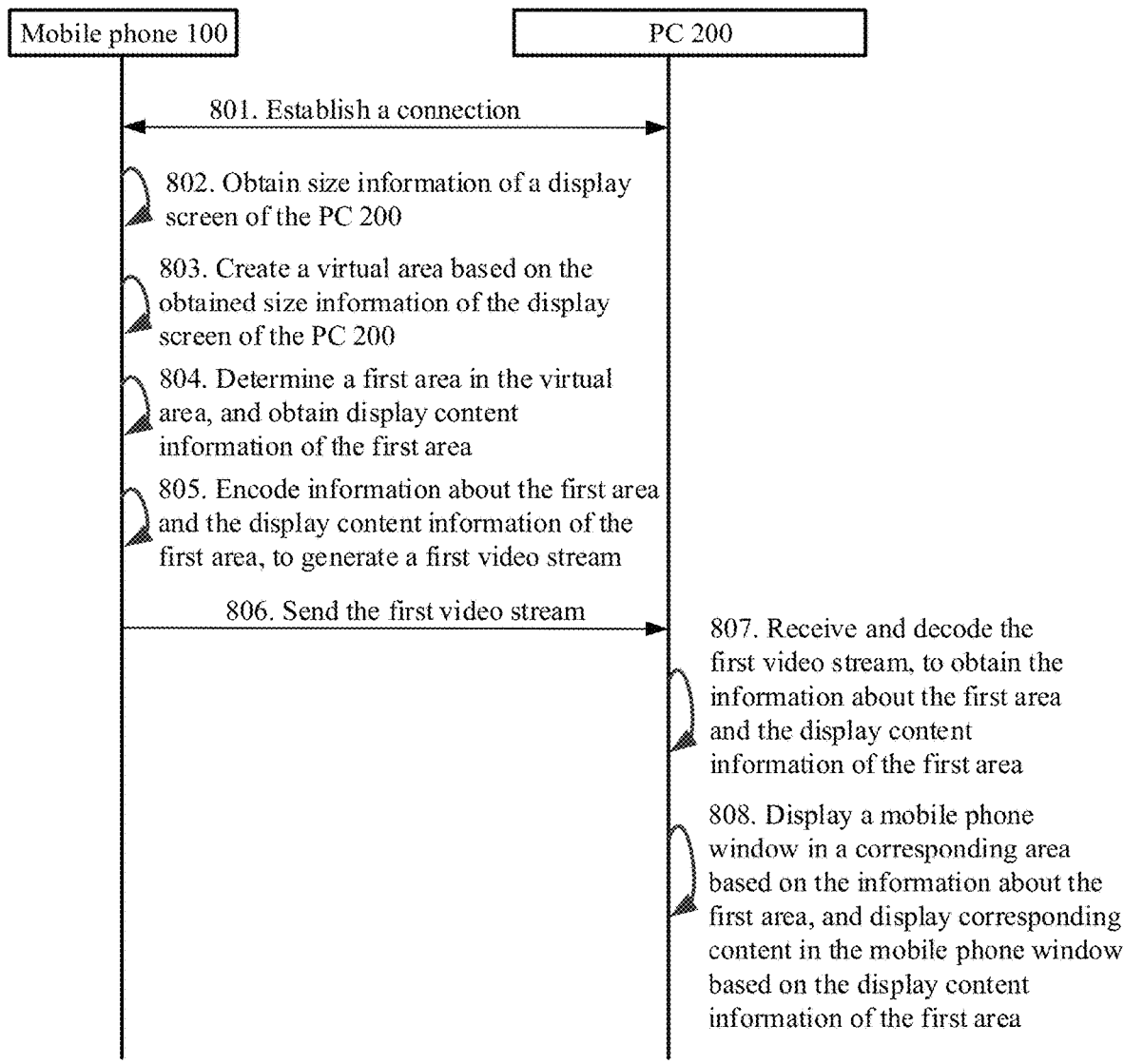
FIG. 8 is a schematic flowchart of a multi-window display method according to an embodiment of this application.

FIG. 8 is a schematic flowchart of a multi-window display method according to an embodiment of this application. As shown in FIG. 8, the method 800 may include the following steps.

801. A mobile phone 100 establishes a connection to a PC 200.

It should be understood that in this embodiment of this application, the mobile phone 100 and the PC 200 need to communicate with each other. For a communication manner, refer to the foregoing description. Details are not described herein again. Specifically, an example in which a connection is established between the mobile phone 100 and the PC 200 through NFC is used. The link discovery service APK of the mobile phone 100 in FIG. 3A may participate in a process of establishing a connection to the PC 200 by the mobile phone 100. Details are not described herein again.

802. The mobile phone 100 obtains size information of a display screen of the PC 200.

It should be understood that this embodiment of this application sets no limitation on an occasion and a manner of obtaining the size information of the display screen of the PC 200 by the mobile phone 100. In a possible implementation, when the mobile phone 100 establishes a connection to the PC 200, the PC 200 may send information such as a size of the display screen to the mobile phone, and the mobile phone 100 may obtain the information such as the size of the display screen of the PC 200.

In another possible implementation, after the mobile phone 100 establishes a connection to the PC 200, the PC 200 may be triggered, based on an operation of a user, to send information such as a size of the display screen to the mobile phone, and the mobile phone 100 may obtain the information such as the size of the display screen of the PC 200. For example, in the operation process shown in FIG. 4, when the user operates an "EMUJI desktop", the PC 200 may send the information such as the size of the display screen to the mobile phone.

It should be further understood that data exchange between the mobile phone 100 and the PC 200 may be transmitted by using different channels based on a process in which a connection is established between the two parties. For example, data between the mobile phone 100 and the PC 200 may be transmitted by discovering and establishing a Wi-Fi p2p path. Alternatively, if a connection is established between the mobile phone 100 and the PC 200 through Bluetooth, the information such as the size of the display screen of the PC 200 may be transmitted to the mobile phone 100 by using a Bluetooth channel. This is not limited in this embodiment of this application.

Specifically, corresponding to the mobile phone 100 described in FIG. 3A, the multi-screen framework service APK at the application program framework layer of the mobile phone 100 may participate in step 801.

803. The mobile phone 100 creates a virtual area based on the obtained size information of the display screen of the PC 200.

804. The mobile phone 100 determines a first area of a mobile phone window 10 in the virtual area.

Optionally, when establishing a connection to the PC 200, the mobile phone 100 may create a virtual area. A size of the virtual area is the same as the size of the display screen of the PC 200.

Figure 9A:
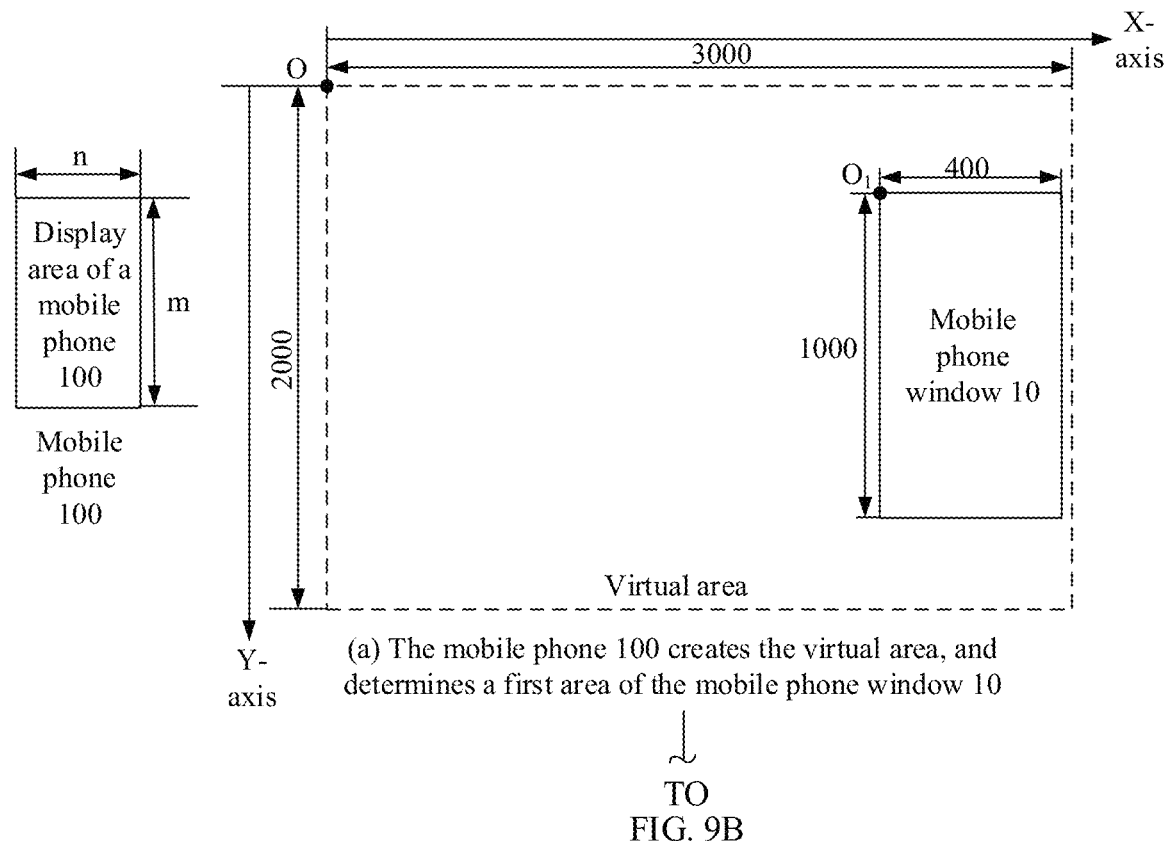
FIG. 9A, FIG. 9B, and FIG. 9C are a schematic diagram of creating a virtual area by a mobile phone according to an embodiment of this application.
Figure 9B:
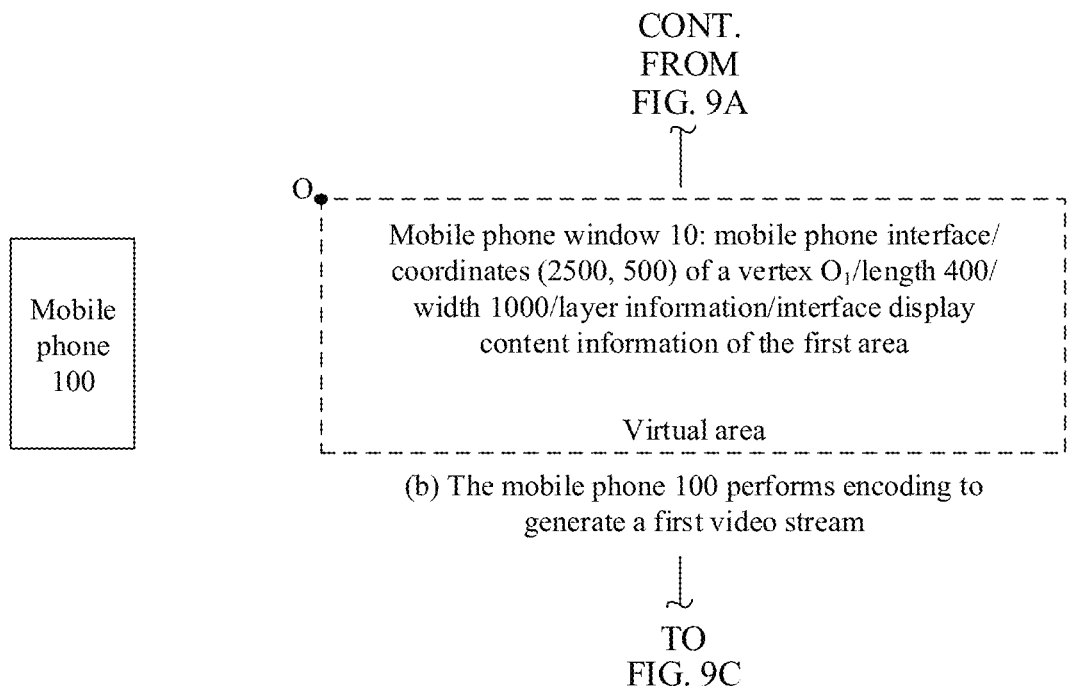
Figure 9C:
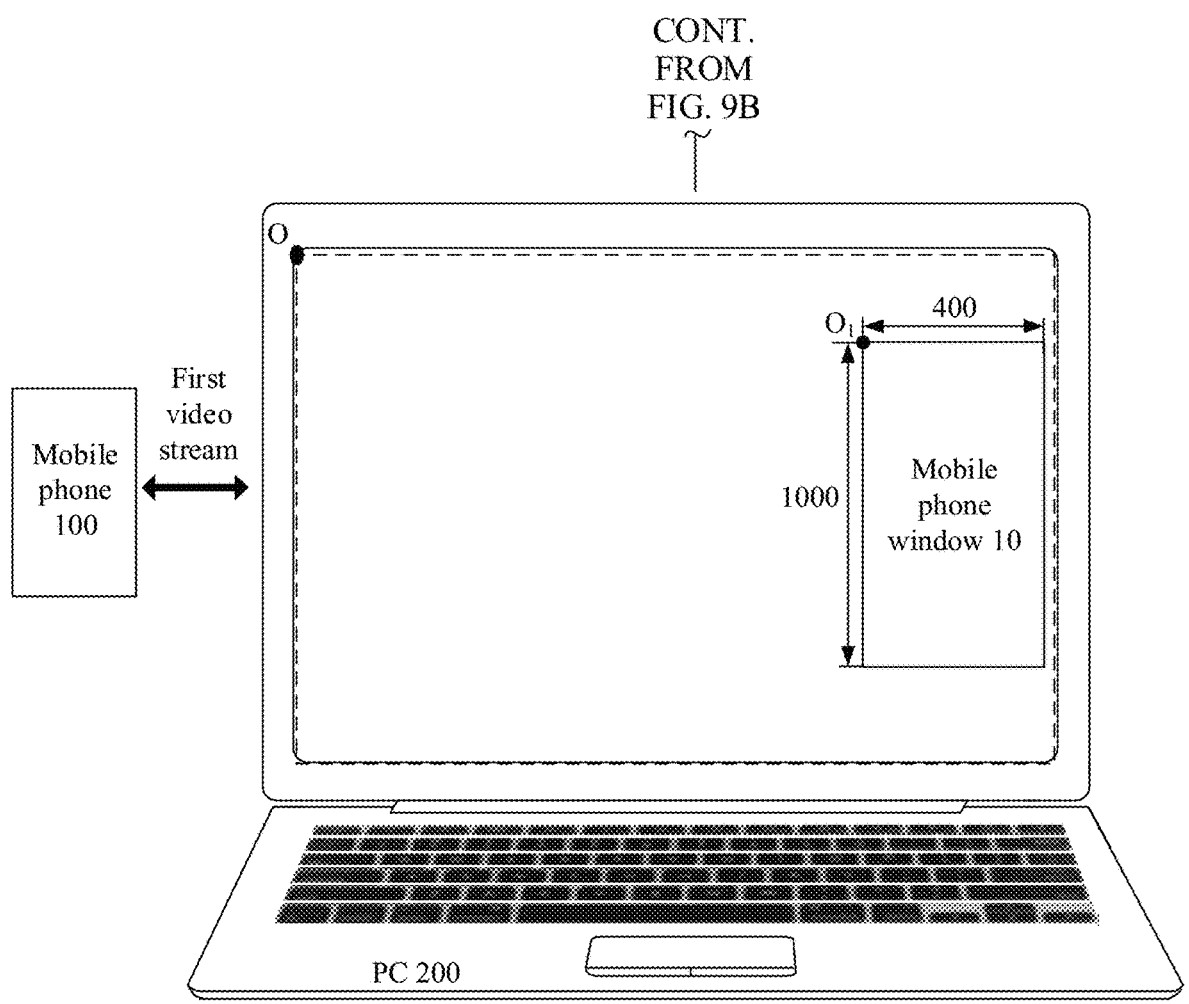

FIG. 9A, FIG. 9B, and FIG. 9C are a schematic diagram of creating a virtual area by a mobile phone 100 according to an embodiment of this application. In this embodiment of this application, for the display screen of the PC 200, a start point at an upper left corner of the display screen is used as a coordinate origin, and the size of the display screen is represented by using pixels in a horizontal direction (an x-axis direction) and a vertical direction (a y-axis direction). In subsequent description, all numbers are location coordinates of pixels. It should be understood that a larger quantity of pixels occupied in a direction indicates a more refined and delicate display effect.

Steps 803 and 804 may correspond to a process that is executed by the mobile phone 100 and that is shown in FIG. 9A.

For example, in this embodiment of this application, the size that is of the display screen of the PC 200 and that is obtained by the mobile phone 100 may be 3000×2000. In other words, the display screen of the PC 200 includes 3000 pixels in the horizontal direction (the x-axis) and 2000 pixels in the vertical direction (the y-axis). As shown in FIG. 9A, the mobile phone 100 creates the virtual area (an area shown by a dashed line) based on the size (3000×2000) information of the display screen of the PC 200. A coordinate origin of the virtual area is O (0, 0), and the virtual area includes 3000 pixels in the x-axis direction and 2000 pixels in the y-axis direction.

After the mobile phone 100 creates the virtual area, the mobile phone 100 determines, in the virtual area, the first area in which the mobile phone window 10 is located. In other words, the mobile phone 100 determines coordinates of a vertex $O_1$ of the first area, pixels included in the x-axis direction, and pixels included in the y-axis direction. Optionally, the coordinates of the vertex of the first area, a quantity of pixels included in the x-axis direction, and a quantity of pixels included in the y-axis direction may be preset in a system, or the first area is determined by the mobile phone 100 based on the size of the display screen of the PC 200 according to a preset rule. This is not limited in this embodiment of this application.

In a possible implementation, the mobile phone 100 may specify coordinates of an initial vertex, a quantity of pixels included in the x-axis direction, and a quantity of pixels included in the y-axis direction for each to-be-displayed window. For example, after the mobile phone 100 sets the coordinates of the initial vertex, the quantity of pixels included in the x-axis direction, and the quantity of pixels included in the y-axis direction for the mobile phone window 10, the mobile phone window 10 may be displayed at a location close to a right frame of the display screen of the PC 200. As shown in (a) in FIG. 7, the mobile phone window 10 is displayed at the location close to the right frame of the display screen of the PC 200, and the mobile phone window 10 is located in the middle between an upper frame and a lower frame of the display screen of the PC 200. Setting of the initial coordinates can prevent the mobile phone window 10 from shielding an original application program (for example, My Computer or Recycle Bin) of the PC displayed in an interface 402 of the PC 200, and can prevent the mobile phone window 10 from shielding a shortcut menu option such as an input method control menu, a time and date setting menu, or power management of the PC displayed in a lower-right corner area in the interface 402 of the PC 200.

Optionally, the mobile phone 100 may specify the quantity of pixels included in the x-axis direction and the quantity of pixels included in the y-axis direction for each to-be-displayed window based on a display area of the mobile phone, to determine a size of the window to be displayed on the PC 200. It should be understood that the display area of the mobile phone herein is a maximum area that may be used to display an interface of the mobile phone on a display screen of the mobile phone 100. As shown in FIG. 9A, the display area of the mobile phone 100 is n×m.

For example, the mobile phone window 10 on the PC 200 may have a same size as the display area (n×m) of the mobile phone. In other words, the size of the mobile phone window 10 includes n pixels in the x-axis direction and m pixels in the y-axis direction.

Alternatively, after scaling up or down the display area (n×m) of the mobile phone based on a proportion, the mobile phone 100 may specify the size as the size of the mobile phone window 10 displayed on the PC 200.

For example, the mobile phone window 10 on the PC 200 is used to display a home screen of the mobile phone 100, and the mobile phone window 10 may be of a size obtained by magnifying the display area (n×m) of the mobile phone by 1.5 times. In other words, the mobile phone 100 specifies that the mobile phone window 10 includes 1.5×n pixels in the x-axis direction and 1.5×m pixels in the y-axis direction.

For example, as shown in FIG. 9A, the coordinates of the vertex $O_1$ of the first area are (2500, 500), and the first area includes 400 pixels in the x-axis direction and 1000 pixels in the y-axis direction.

It should be understood that the process that is of creating the virtual area and the first area by the mobile phone 100 and that is described above may be performed by the processor 110 of the mobile phone 100 in FIG. 1, or is correspondingly completed by a module corresponding to the multi-screen frame service APK of the mobile phone 100 in the software architecture in FIG. 3A. In addition, the process of creating the virtual area by the mobile phone 100 may be understood as determining information about the virtual area, and the process of determining the first area by the mobile phone 100 may be understood as determining information about the first area. The process is an internal execution process of the mobile phone 100, does not need to be displayed on the mobile phone 100. The process is completed by the mobile phone 100, and is not displayed on the PC 200.

The mobile phone 100 determines the information $O_1$ (2500, 500) about the first area, where the first area includes 400 pixels in the x-axis direction and 1000 pixels in the y-axis direction.

805. The mobile phone 100 encodes the information about the first area and display content information of the first area, to generate a first video stream.

806. The mobile phone 100 sends the first video stream to the PC 200.

It should be understood that the first video stream includes the information about the first area, and may specifically include information such as the coordinates of the vertex, a length, and a width of the first area on the display screen of the PC 200.

Optionally, the information about the first area may further include display level information of the mobile phone window 10. It should be understood that a display layer herein is used to indicate a layer at which the window is displayed on the PC 200 in a current display method. For example, the PC 200 includes three mobile phone windows, a window displayed at an uppermost layer is displayed at the first layer, and a window displayed at a lowermost layer is displayed at the third layer.

Optionally, the layer information may not be sent by the mobile phone 100 to the PC 200, but the PC 200 manages layer display of all windows based on a time of receiving information about each window and an operation performed by the user on the PC 200. For example, when a window 40 of a music application is displayed at a layer above a window 50 of a video application, and the user selects the window 50 of the video application on the PC, the PC 200 determines that the window 50 of the video application is displayed at the uppermost layer.

In a possible implementation, the mobile phone window 10 may be displayed at the uppermost layer of the PC 200 by default. Because display content in the mobile phone window 10 may correspond to the home screen 401 of the mobile phone 100 or include an application program of the mobile phone 100, the mobile phone window 10 is displayed at the uppermost layer of the PC 200, to facilitate use of the user. In addition, the mobile phone window 10 is located at the location close to the right frame of the display screen of the PC 200, and does not shield an original application that is of the PC 200 and that is used by the user.

It should be understood that the display content information that is of the first area and that is included in the first video stream is used by the PC 200 to display content of the mobile phone 100 in the mobile phone window 10. In other words, the PC 200 may fill the first area based on the display content information of the first area, so that content displayed in the first area on the display screen of the PC 200 is an interface of the mobile phone 100.

For example, as shown in (a) in FIG. 4, when the home screen of the mobile phone 100 is displayed in the mobile phone window 10, the display content information of the first area includes a wallpaper of the home screen of the mobile phone 100, icons of all application programs, a window including a time, a date, and weather, and an operator name, a network signal identifier, power display information, and the like in a notification bar at the top of the interface of the mobile phone 100. Alternatively, for example, as shown in (b) in FIG. 4, when an interface of the music application of the mobile phone 100 is displayed in the mobile phone window 10, the display content information of the first area includes a wallpaper of the interface of the music application, and each control, a song name, a play progress, a singer image, and the like in the interface of the music application.

In a possible case, in a process of displaying a window of the mobile phone 100 by using the PC 200, the PC 200 may further display a window related to an application that currently runs on the PC 200, for example, the display screen of the PC 200 displays a web page window opened by the user on the PC 200. Optionally, after the mobile phone 100 is connected to the PC 200, when the mobile phone window 10 initially appears on the display screen of the PC 200, the mobile phone window 10 is displayed at the uppermost layer, to facilitate an operation of the user. If the user does not use an application in the mobile phone window 10 currently, and continues to use the opened web page window on the PC 200, the user may tap/click any location of the web page window to display the web page window at the uppermost layer of the PC 200, and move the mobile phone window 10 down by one layer (display the mobile phone window 10 at the second layer). Alternatively, the user may tap/click a hide to sidebar key 11-1 or a hide to menu bar key 11-2 in a gray menu bar 11 of the mobile phone window 10 to hide the mobile phone window 10. In this case, the mobile phone window 10 is temporarily not displayed on the display screen of the PC 200. In addition, it should be further understood that the MSDP service APK of the mobile phone 100 described in FIG. 3A may participate in the foregoing encoding process of the first video stream, and the MSDP service APK may implement a function including video stream encoding and the like. Specifically, the multi-screen frame service APK of the mobile phone 100 may send the determined information about the first area and the determined display content information of the first area to the MSDP service APK, and the MSDP service APK encodes the information about the first area and the display content information of the first area, to generate the first video stream. The encoding process of the video stream is not described herein again.

Optionally, the first video stream may be transmitted by using a dedicated video stream channel provided by the MSDP service, or may be transmitted by using a channel established in the process in which the mobile phone 100 establishes a connection to the PC 200 in step 701. This is not limited in this embodiment of this application. It should be understood that the first video stream has a data format that can be parsed by both the mobile phone 100 and the PC 200. Details are not described herein.

Step 805 may correspond to a process that is executed by the mobile phone 100 and that is shown in FIG. 9B, and the process is also a video stream encoding process inside the mobile phone 100.

807. The PC 200 receives and decodes the first video stream, to obtain the information about the first area and the display content information of the first area.

808. The PC 200 displays the mobile phone window 10 in a corresponding area based on the information about the first area, and displays corresponding content in the mobile phone window 10 based on the display content information of the first area.

The PC 200 receives the first video stream sent by the mobile phone 100, and decodes the first video stream. It should be understood that a decoding manner corresponds to an encoding manner of the mobile phone 100. The process may be executed by the MSDP service APK of the PC 200, and the MSDP service APK sends, to the multi-screen frame service APK, the information that is about the first area and that is obtained after the first video stream is decoded. The multi-screen frame service APK determines the information such as the coordinates of the vertex, the length, and the width of the mobile phone window 10 on the display screen of the PC 200 based on the information about the first area, to determine a display area of the mobile phone window 10.

In addition, the PC 200 further obtains the display content information of the first area from the first video stream. The PC 200 may fill the mobile phone window 10 based on the display content information of the first area, so that content displayed in the mobile phone window 10 on the display screen of the PC 200 is an interface of the mobile phone 100. When the interface may be the home screen of the mobile phone 100 or an interface of any application of the mobile phone 100, the display content information of the first area includes the wallpaper of the interface of the music application, and each control, the song name, the play progress, the singer image, and the like in the interface of the music application.

Corresponding to the mobile phone display module of the PC 200 in FIG. 3B, the MSDP service APK sends the obtained display content information of the first area to the multi-screen frame service APK. Finally, the mobile phone window display of the multi-screen frame service APK module displays corresponding interface content based on the display content information of the first area.

In the foregoing process in steps 801 to 808, the display screen of the PC 200 may display the mobile phone window 10, and the home screen of the mobile phone 100 may be displayed in the mobile phone window 10, or any interface of the mobile phone 100 in a use process of the user may be synchronously displayed in the mobile phone window 10. For example, as shown in (a) in FIG. 4, the PC 200 may display the mobile phone window 10 in the main interface 402. Display content in the mobile phone window 10 may continuously display the home screen of the mobile phone 100. Alternatively, as shown in (b) in FIG. 4, display content in the mobile phone window 10 of the PC 200 may be synchronized with that on the mobile phone 100, and is the interface of the music application.

Steps 807 and 808 may correspond to a process that is executed by the mobile phone 100 and that is shown in FIG. 9C. Specifically, the PC 200 corresponds the first area to a corresponding location on the display screen of the PC 200 based on the coordinates of the vertex, the length, and the width of the first area in the virtual area. The location corresponding to the first area is the display area of the mobile phone window 10. In other words, coordinates of the mobile phone window 10 on the display screen of the PC 200 are coordinates of the first area in the virtual area.

In a possible implementation, in step 805, the mobile phone 100 may encode the information about the virtual area, the information about the first area, and the display content information of the first area together, to generate the first video stream, and send the first video stream to the PC 200. The PC 200 directly determines a location of the mobile phone window 10 on the display screen of the PC 200 based on the location of the first area in the virtual area, and displays the display content of the first area in the mobile phone window 10.

In a possible implementation, in step 805, the mobile phone 100 encodes information about the display area (n×m) of the mobile phone to generate the first video stream, and sends the first video stream to the PC 200. The PC 200 determines, based on the information about the display area (n×m) of the mobile phone, a location and a size of the mobile phone window 10 that is used to display the home screen of the mobile phone. Optionally, for a manner of determining the location and the size of the mobile phone window 10 by the PC 200, refer to the foregoing process in which the mobile phone 100 determines the coordinates of the vertex of the first area, the quantity of pixels in the x-axis direction, and the quantity of pixels in the y-axis direction. Details are not described herein again. Similarly, for the window 40 of the music application, the PC 200 may also determine, based on information that is sent by the mobile phone 100 and that is about the interface of the music application displayed on the mobile phone, a location and a size of the window 40 that is used to display the music application.

It should be understood that when the user moves the window 40 of the music application on the PC 200, coordinates of the window 40 of the music application may be sent by the PC 200 to the mobile phone 100, and the mobile phone 100 may update information about the coordinates of the window 40 of the music application. In other words, information is exchanged between the mobile phone 100 and the PC 200 in real time. When a location, a size, or the like of a window on the PC 200 changes, the PC 200 may notify the mobile phone 100 of information such as the changed location and size of the window. The mobile phone 100 may accurately obtain information about the window of the music application at any time. A window coordinate synchronization module of the MSDP service APK of the mobile phone 100 described in FIG. 3A may participate in the process. Further, the mobile phone 100 may learn of, in real time, a location of each application window displayed on the PC 200, a location of a function control included in each application, and the like, so that the user can use and operate an application of the mobile phone 100 on the PC 200.

Figure 10:
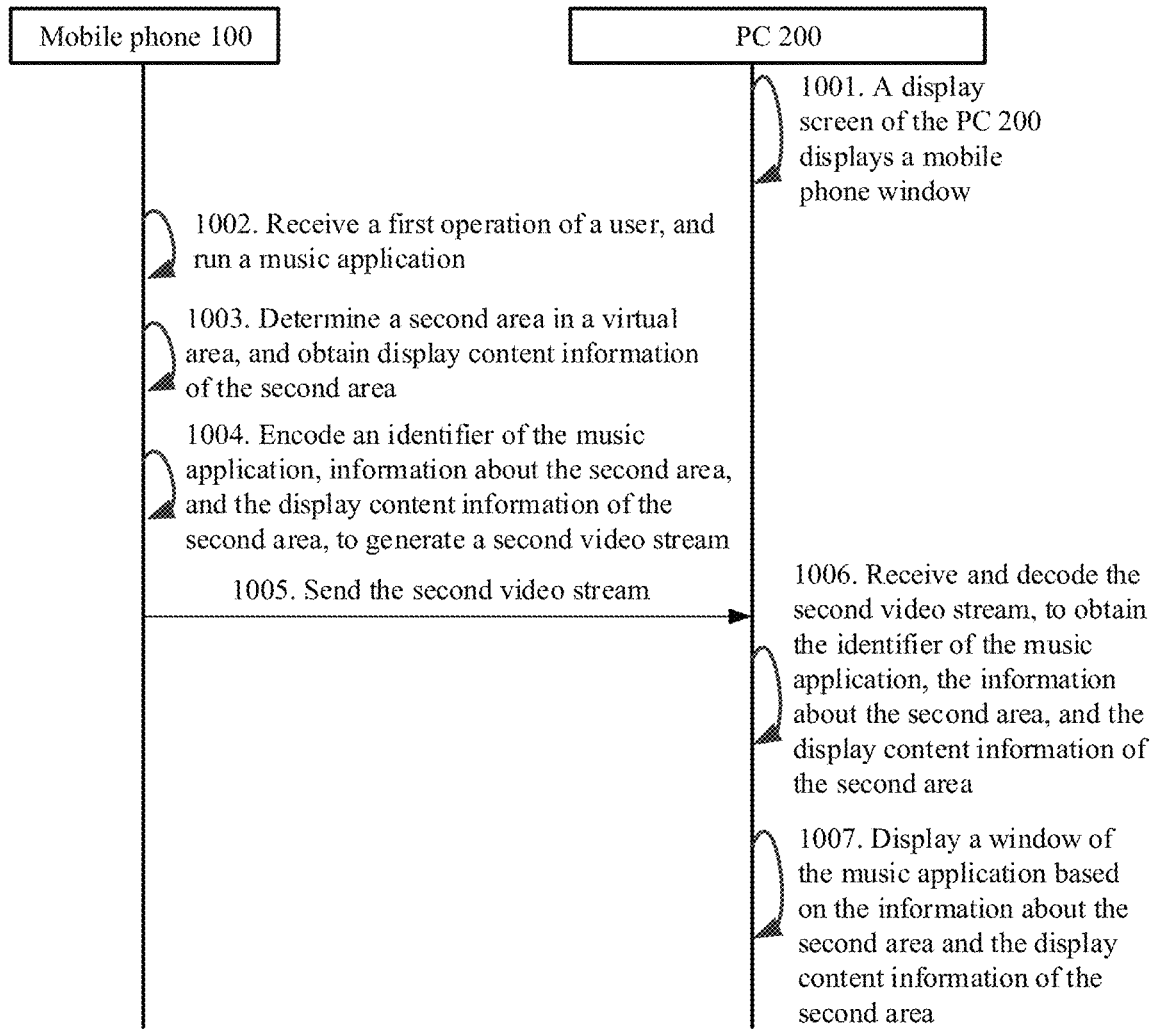
FIG. 10 is another schematic flowchart of a multi-window display method according to an embodiment of this application.

FIG. 10 is another schematic flowchart of a multi-window display method according to an embodiment of this application. A process shown in FIG. 10 may be executed after the process shown in FIG. 8. In other words, after a display screen of a PC 200 has displayed a mobile phone window 10, the process shown in FIG. 10 may be continued. It should be understood that the process 1000 may correspond to the process shown in (a) in FIG. 6. A user performs an operation on a music application of a mobile phone on a mobile phone 100 side, and in response to the operation performed by the user on the mobile phone 100, the PC 200 may display a window 40 of the music application in addition to the original mobile phone window 10.

As shown in FIG. 10, the method 1000 may include the following steps.

1001. The display screen of the PC 200 displays the mobile phone window 10.

1002. The mobile phone 100 receives a first operation of the user, and runs the music application.

In this embodiment of this application, an example in which the user taps and runs the music application is used for description. It should be understood that the first operation may be a tapping operation performed by the user on the mobile phone 100 on the music application. In response to the tapping operation of the user, the music application is opened and entered on the mobile phone 100, that is, the mobile phone 100 may display an interface of the music application. Therefore, running the music application herein may be running the music application in the foreground, that is, a display screen of the mobile phone 100 displays the interface of the music application. 1003. The mobile phone 100 determines a second area in the virtual area in step 803, and obtains display content information of the second area.

Figure 11A:
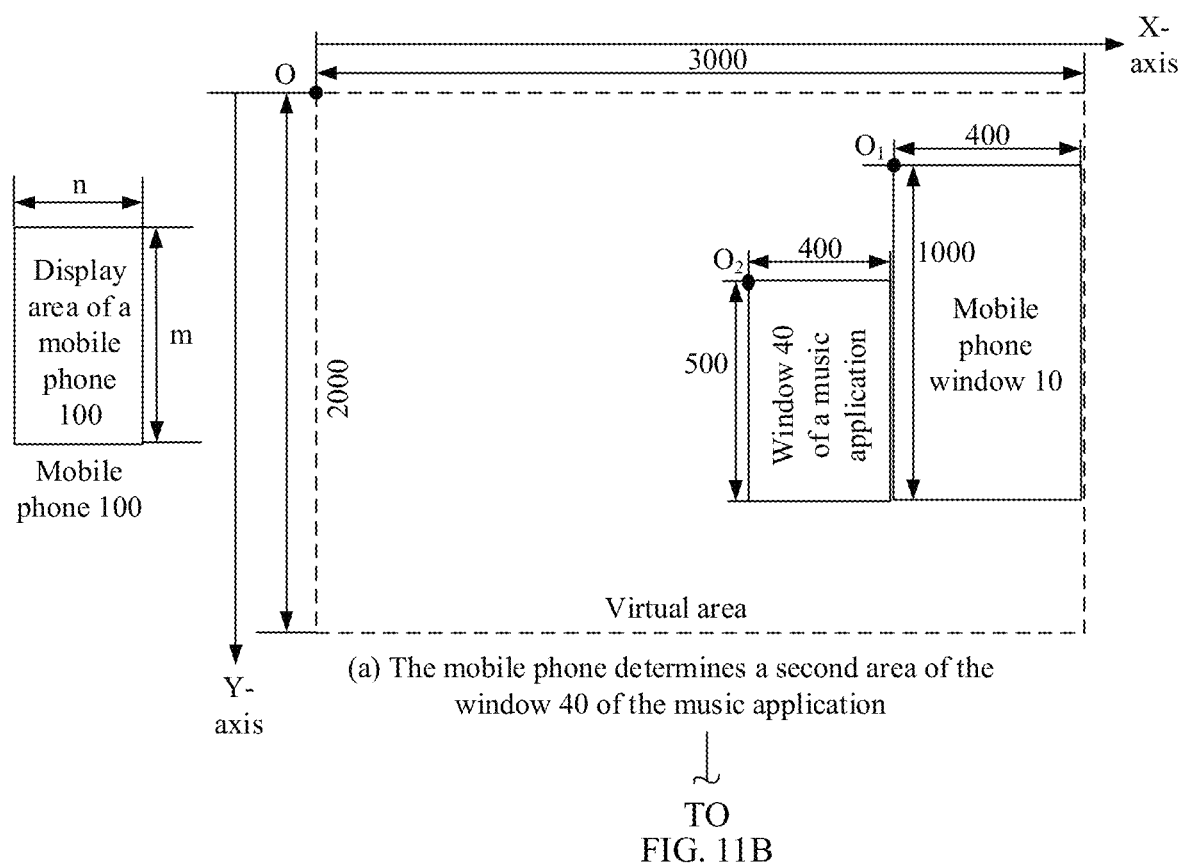
FIG. 11A, FIG. 11B, and FIG. 11C are another schematic diagram of creating a virtual area by a mobile phone according to an embodiment of this application.
Figures 11A, 11B, 11C:
Figure 11C:
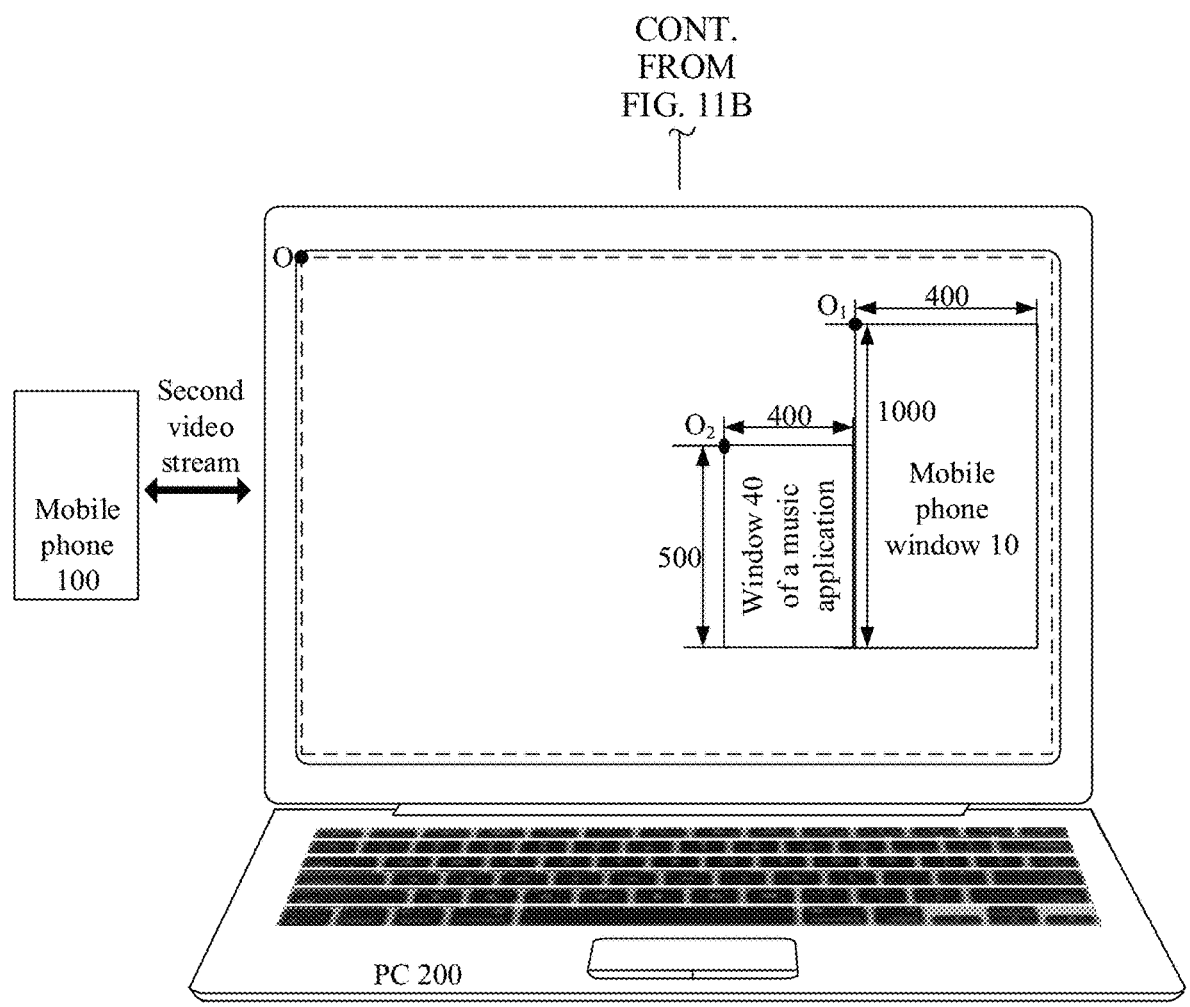

It should be understood that, in step 803, the virtual area created by the mobile phone 100 has a same size as the display screen of the PC 200, and the mobile phone 100 has determined a first area in the virtual area for the mobile phone window 10. In step 1003, the mobile phone 100 determines the second area in the created virtual area for the window 40 of the music application. FIG. 11A, FIG. 11B, and FIG. 11C are another schematic diagram of creating a virtual area by a mobile phone 100 according to an embodiment of this application. Steps 1003 and 1004 may correspond to a process that is executed by the mobile phone 100 and that is shown in FIG. 11A.

For example, as shown in FIG. 11A, in step 803, the mobile phone 100 creates a virtual area shown by a dashed line. A coordinate origin of the virtual area is 0 (0, 0), and the virtual area includes 3000 pixels in an x-axis direction and 2000 pixels in a y-axis direction.

In step 804 in FIG. 8, the mobile phone 100 determines a location and a size of the mobile phone window 10 in various possible manners. Similarly, the mobile phone 100 may further determine, for each application, a location and a size of a window for displaying the application.

In a possible implementation, coordinates of an initial vertex of a window for displaying each application on the PC 200 may be set by the mobile phone 100, and a quantity of pixels included in the x-axis direction and a quantity of pixels included in the y-axis direction may also be set by the mobile phone 100.

Optionally, the mobile phone 100 may specify coordinates of an initial vertex, a quantity of pixels included in the x-axis direction, and a quantity of pixels included in the y-axis direction for the to-be-displayed window 40 of the music application based on information about a display area (n×m) of the mobile phone 100.

For example, the window 40 of the music application on the PC 200 is used to display the interface of the music application of the mobile phone, and the window 40 of the music application may have a same size as the display area (n×m) of the mobile phone. In other words, the window 40 of the music application includes n pixels in the x-axis direction and m pixels in the y-axis direction. In this case, to ensure that the window 40 of the music application is close to the mobile phone window 10 and does not shield content in the mobile phone window 10, an x-axis coordinate of the vertex $O_2$ of the window 40 of the music application is obtained by subtracting n from an x-axis coordinate of $O_1$. A y-axis coordinate of the vertex $O_2$ may be the same as a y-axis coordinate of $O_1$, or a y-axis coordinate is obtained by subtracting m from a value obtained by adding a y-axis coordinate of $O_1$ and a y-axis size of the mobile phone window 10.

As shown in FIG. 11A, when n=400 and m=1000, in the virtual area, the mobile phone 100 determines the second area of the window 40 of the music application. The second area includes 400 pixels in the x-axis direction and 500 pixels in the y-axis direction, where 400 is equal to n, and 500 pixels are 0.5×m. After determining a size of the second area, the mobile phone 100 may further determine that coordinates of the vertex $O_2$ are (2100, 1000), to ensure that the window 40 of the music application is close to the mobile phone window 10.

Alternatively, for example, a window 50 of a video application on the PC 200 is used to display an interface of the video application of the mobile phone. The window 50 of the video application may have a same size as the display area (n×m) of the mobile phone, m in the display area (n×m) of the mobile phone is used as a quantity of pixels included in the x-axis direction, and n is used as a quantity of pixels included in the y-axis direction. The size of the window 50 of the video application can be better adapted to a process in which the user views a video, thereby improve viewing experience of the user.

Optionally, the mobile phone 100 may specify the quantity of pixels included in the x-axis direction and the quantity of pixels included in the y-axis direction for the to-be-displayed window 40 of the music application based on the information about the display area (n×m) of the mobile phone 100 and a preset proportion relationship. For example, the mobile phone 100 specifies that the window 40 of the music application includes 1.5×n pixels in the x-axis direction and 1.5×m pixels in the y-axis direction.

In another possible implementation, the mobile phone 100 may determine, for the to-be-displayed window 40 of the music application based on the interface that is of the music application and that is displayed when the mobile phone runs the music application, the quantity of pixels included in the x-axis direction and the quantity of pixels included in the y-axis direction, to determine a size of a window to be displayed on the PC 200. It should be understood that the interface that is of the music application and that is displayed when the mobile phone runs the music application herein may be less than the display area n×m of the mobile phone 100. For example, a size of the interface that is of the music application and that is displayed when the mobile phone runs the music application is p×q. It should be understood that, in this embodiment of this application, values of n and m may be obtained by the mobile phone 100 based on information about the display screen, and values of p and q may be information obtained when an installation package of the music application is installed on the mobile phone 100, or information configured by the mobile phone 100 for the music application. This is not limited in this embodiment of this application.

Optionally, the size of the window 40 of the music application may be the same as the size (p×q) of the interface of the music application displayed on the mobile phone 100. In other words, the window 40 of the music application includes p pixels in the x-axis direction and q pixels in the y-axis direction. In this case, to ensure that the window 40 of the music application is close to the mobile phone window 10 and does not shield content in the mobile phone window 10, an x-axis coordinate of the vertex $O_2$ of the window 40 of the music application is obtained by subtracting p from an x-axis coordinate of $O_1$. A y-axis coordinate of the vertex $O_2$ may be the same as a y-axis coordinate of $O_1$, or a y-axis coordinate is obtained by subtracting q from a value obtained by adding a y-axis coordinate of $O_1$ and a y-axis size of the mobile phone window 10.

In another possible implementation, the mobile phone 100 determines, according to a preset rule, the quantity of pixels included in the x-axis direction and the quantity of pixels included in the x-axis direction. For example, if the mobile phone 100 determines the coordinates of the initial vertex, the quantity of pixels included in the x-axis direction and the quantity of pixels included in the y-axis direction may be determined according to the preset rule. For example, a rule for setting initial coordinates of the window 40 of the music application that starts and runs first may be as follows: A right frame of the window 40 of the music application is close to a left frame of the mobile phone window 10, and the window 40 does not shield the content in the mobile phone window 10. A rule for setting initial coordinates of the window 50 of the video application that starts and runs second may be as follows: A right frame of the window 50 of the video application is close to a left frame of the window 40 of the music application, and the window 50 does not shield content in the window 40 of the music application. Alternatively, a right frame of the window 50 of the video application that starts and runs second is still close to the left frame of the mobile phone window 10, and the window 50 of the video application that starts and runs second is located at an upper layer of the window 40 of the music application that starts and runs first. It should be understood that, because the user currently taps the video application, if the window 50 of the video application has an area overlapping the window 40 of the music application, the window 50 of the video application is displayed at the upper layer of the window 40 of the music application. If the user taps/clicks the window 50 of the music application, the window 50 of the music application is displayed at an upper layer of the window 50 of the video application.

For example, as shown in (a) in FIG. 6, the window 40 of the music application is displayed at a location close to the left frame of the mobile phone window 10, and the window 40 of the music application is located in the middle between an upper frame and a lower frame of the display screen of the PC 200. Setting of the initial coordinates may prevent the window 40 of the music application from shielding the mobile phone window 10, so that the user continues to use an application program in the mobile phone window 10.

It should be further understood that after determining information about the second area, the mobile phone 100 may further obtain the display content information of the second area, and the display content information is used by the PC 200 to display interface content of the music application of the mobile phone 100 in the window 40 of the music application. In other words, the PC 200 may fill the second area based on the display content information of the second area, so that content displayed in the second area of the display screen of the PC 200 is the interface content of the music application of the mobile phone 100.

Optionally, the information about the second area may further include identifier information of the music application. Specifically, the identifier information of the music application is used to identify that the window is a window of the music application, and both the PC 200 and the mobile phone 100 may determine that the window is a window of the music application. When the user performs an operation on the window on the PC 200, the PC 200 may determine that the operation is for the music application, to subsequently transfer the operation back to the mobile phone 100 accurately. It should be understood that the mobile phone 100 and the PC 200 may determine, in another manner, an application corresponding to each window, or determine an application corresponding to an operation performed by the user in the window, to accurately provide a service.

Optionally, the information about the second area further includes display level information. Specifically, a display layer herein is used to indicate a layer at which the window 40 of the music application is displayed on the PC 200 in a current display method. For example, if the user currently runs the music application, the music application is displayed at the first layer, that is, displayed at an uppermost layer of the display screen of the PC 200. Similarly, when the user successively taps and runs the music application, the video application, and a chat application of the mobile phone 100, a window of the chat application on the display screen of the PC 200 is displayed at the first layer, the window of the video application is displayed at the second layer, and the window of the music application is displayed at the third layer. In addition, when the user taps the window of the music application again, the window of the music application is displayed at the uppermost layer, and details are not described in this embodiment of this application.

1004. The mobile phone 100 encodes the identifier information of the music application, the information about the second area, and the display content information of the second area, to generate a second video stream.

It should be understood that step 1005 may correspond to a process that is executed by the mobile phone 100 and that is shown in FIG. 11B. The process is also a video stream encoding process inside the mobile phone 100. For details, refer to the process of step 805. The multi-screen frame service APK of the mobile phone 100 sends the determined identifier information of the music application, the determined information about the second area, and the determined display content information of the second area to the MSDP service APK. The MSDP service APK encodes the information about the second area and the display content information of the second area, to generate the second video stream.

1005. The mobile phone 100 sends the second video stream to the PC 200.

1006. The PC 200 receives and decodes the second video stream, to obtain the identifier information of the music application, the information about the second area, and the display content information of the second area.

1007. The PC 200 displays the window 40 of the music application in a corresponding area based on the information about the second area and the display content information of the second area.

Steps 1006 and 1007 may correspond to a process that is executed by the mobile phone 100 and that is shown in FIG. 11C. In the foregoing process in steps 1001 to 1007, the mobile phone window 10 and the window 40 of the music application may be displayed on the display screen of the PC 200. For example, as shown in (a) in FIG. 6, the PC 200 may display the mobile phone window 10 and the window 40 of the music application in the main interface 402. Display content in the mobile phone window 10 may be the home screen of the mobile phone 100, and display content in the window 40 of the music application may be the interface of the music application of the mobile phone 100.

It should be understood that after the user starts the music application on the mobile phone 100, runs the music application in the foreground, and completes step 1007, the window 40 of the music application is displayed on the PC 200. When the user starts and runs the music application in the foreground and completes step 1007, even if the user exits to the home screen of the mobile phone 100 or switches to another application, the music application runs in the background, and does not affect a process of displaying the window 40 of the music application on the PC 200.

In another possible case, the user taps the icon of the music application on the home screen 401 of the mobile phone 100, and plays music. As shown in (a) and (b) in FIG. 4, the mobile phone window 10 displayed on the PC 200 may be displayed as the interface of the music application or the window 40 of the music application may be displayed on the PC 200. In this case, the music audio may be actually played on a device in which the music application is started. Specifically, if the user taps the music application on the mobile phone 100, a device that actually plays the music audio is the mobile phone 100.

Alternatively, the user plays music by tapping/clicking a music application 14 in the mobile phone window 10 of the PC 200. As shown in (a) in FIG. 6, the window 40 of the music application is displayed on the PC 200, and the mobile phone window 10 may also be displayed as the interface of the music application. In this case, the device that actually plays the music audio is the PC 200.

Similarly, in another possible case, when the user is playing music by using the mobile phone 100, as shown in (a) and (b) in FIG. 4, a device that actually plays the music audio when the music application runs is the mobile phone 100. If the user taps/clicks a video application 15 in the mobile phone window 10 of the PC 200, and plays video by using the window 50 of the video application, the PC 200 may display the interface 402 shown in (a) in FIG. 7. In this case, a device that actually plays a video (including audio and an image) is the PC 200. In other words, even if the mobile phone 100 sends the information about video content in the window 50 of the video application by using the video stream, after the information about the video content is obtained by the PC 200, the video is played by a play device such as a display or a speaker of the PC 200. The video application runs in the background for the mobile phone 100, and therefore may not affect original music that is being played on the mobile phone 100.

In addition, if the operations of running the music application and the video application are completed by the user in the mobile phone window 10 of the PC 200, the devices for playing the music and playing the video are the PC 200. In this case, for an audio preemption principle, refer to a solution in the prior art. For example, if a priority of the video application that runs later is higher, audio play of the music is automatically paused. This is not limited in this embodiment of this application.

It should be understood that the foregoing describes a process of displaying two windows (the mobile phone window 10 and the window 40 of the music application) by the PC 200. Based on the method described above, the user may further run more applications of the mobile phone 100, such as a video application, a chat application, and an office software application. A plurality of windows may be displayed on the PC 200, and each window corresponds to a different mobile phone application. Details are not described herein.

In the foregoing multi-window display method provided in this embodiment of this application, for the mobile phone 100 and the PC 200 that communicate with each other, content of the mobile phone 100 may be displayed by using the PC 200. When the user runs a plurality of applications on the mobile phone 100, a plurality of windows may be displayed on the PC 200, and each window is used to display a different application. Each window may receive an operation of the user, for example, an operation of closing, moving, scaling, maximizing, and minimizing the window. In addition, the user may perform an operation on each mobile phone application in a window that corresponds to the mobile phone application and that is displayed on the PC 200. For example, the user taps/clicks a control such as Play and Next in the window that is of the music application and that is on the PC 200, to control a music play process. In addition, an operation performed by the user on the mobile phone application on the PC 200 does not affect use of another function of the user on the mobile phone 100, for example, the foregoing scenario in which the user plays music by using the mobile phone 100 and views a video by using the PC 200 at the same time. In the method, office efficiency such as file sharing can be improved, and user experience is improved.

In a specific implementation process, the mobile phone 100 encodes, by using a video stream transmission process, identifier information of different running applications, and information such as coordinates of a vertex, a length, and a width of a window for displaying the application on the PC 200, to generate a video stream. For example, the mobile phone 100 encodes the identifier information of the music application, information such as coordinates of a vertex, a length, and a width of the window 40 for displaying the music application on the PC 200, identifier information of the video application, and information such as coordinates of a vertex, a length, and a width of the window 50 for displaying the video application on the PC 200, to generate one video stream, and sends the video stream to the PC 200. After receiving and decoding the video stream, the PC 200 distinguishes between different information, to accurately display the interface content of the music application in the window 40 of the music application, and display the interface content of the video application in the window 50 of the video application.

It should be understood that the one video stream is a video stream sent by using one video stream transmission channel. If a video transmission channel meets a transmission condition, encoding may be performed to generate a plurality of video streams. For example, identifier information of the music application and information such as coordinates of a vertex, a length, and a width of the window 40 for displaying the music application on the PC 200 are encoded to generate one video stream that is sent by using one video stream transmission channel. Identifier information of the video application and information such as coordinates of a vertex, a length, and a width of the window 50 for displaying the video application on the PC 200 are encoded to generate another video stream that is sent by using another video stream transmission channel. Compared with an existing video stream encoding and transmission process, in the solution, in the encoding method for generating one video stream, power consumption of the mobile phone can be reduced, and a quantity of windows that are of mobile phone applications and that are displayed on the PC 200 is not limited.

It should be understood that the following is described in the foregoing embodiments: The mobile phone 100 sends location information of a first window and display content information of a first interface to the PC 200, and the PC 200 displays the first window based on an indication of the mobile phone 100. Optionally, the mobile phone 100 may not obtain size information of a display area of the PC 200, but send only the display content information of the first interface of the mobile phone 100. The PC 200 determines the location information of the first window, and displays the first window. Similarly, display of a second window may also be determined by the PC 200.

In the foregoing solution, the PC 200 may determine display locations of the first window and the second window based on application use, interface content, and the like of the PC 200, to be better adapted to a use process of the PC 200, reduce impact on use of the PC 200, and improve user experience. With reference to FIG. 10, FIG. 11A, FIG. 11B, and FIG. 11C, the following is described above: After the display screen of the PC 200 has displayed the mobile phone window 10, the user may tap the music application in the interface of the mobile phone 100, and may display the window 40 of the music application on the PC 200. In addition, the user may tap/click the music application 14 in the mobile phone window 10 of the PC 200, or may display the window 40 of the music application on the PC 200.

Figure 12:
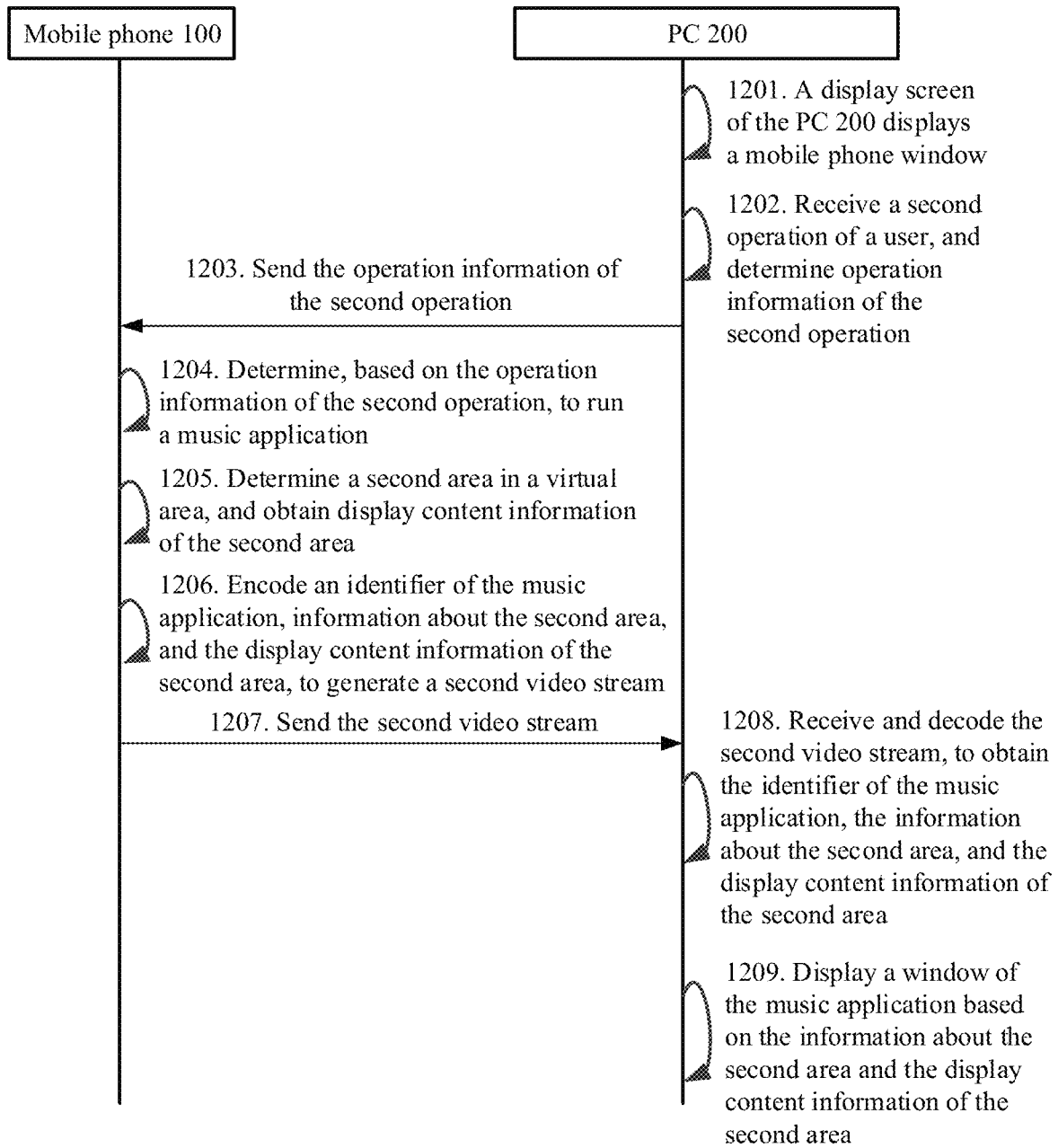
FIG. 12 is another schematic flowchart of a multi-window display method according to an embodiment of this application.

FIG. 12 is another schematic flowchart of a multi-window display method according to an embodiment of this application. As shown in FIG. 12, the method 1200 may include the following steps.

1201. A display screen of a PC 200 displays a mobile phone window 10.

1202. The PC 200 receives a second operation of a user, and determines operation information of the second operation.

In this embodiment of this application, an example in which the user taps/clicks and runs a music application 14 in the mobile phone window 10 of the PC 200 is used. It should be understood that the second operation may be an operation performed on an application to start the application. In this embodiment of this application, a first operation and the second operation may be different operations performed for different devices. For example, for the PC 200, the user may run the music application by performing a clicking operation or double-clicking operation by using a peripheral input device such as a mouse or a keyboard. Alternatively, if the PC 200 is a device with a touchscreen, the user may run the music application through touching and tapping. An operation type of the second operation is not limited in this embodiment of this application.

Optionally, the operation information of the second operation includes an operation event for an application in the mobile phone window 10, and the operation information of the second operation may further include at least one type of information such as a name, an ID, and an icon of the music application.

Specifically, for the PC 200, the second operation is an operation event ("touch event"). After receiving the "touch event", the PC 200 determines the name, the ID, and the icon of the music application in which the "touch event" occurs and coordinates of the "touch event" on the PC, that is, determines the operation information of the second operation.

1203. The PC 200 sends the operation information of the second operation to a mobile phone 100.

1204. The mobile phone 100 determines, based on the received operation information of the second operation, to run the music application.

The PC 200 transfers the "touch event" to the mobile phone 100. A system of the mobile phone 100 determines the "touch event", and sends the "touch event" to the corresponding music application. The music application of the mobile phone 100 determines that the "touch event" is used to tap and run the music application. It should be understood that, for the mobile phone 100, the music application may run in the foreground. For example, an interface of the music application is directly displayed on a home screen 401 of the mobile phone 100. Alternatively, the music application may run in the background. For example, an interface of the music application is not displayed in the interface of the mobile phone 100, and the music application runs only in the background.

1205. Determine a second area in a virtual area, and obtain display content information of the second area.

1206. Encode an identifier of the music application, information about the second area, and the display content information of the second area, to generate a second video stream.

1207. The mobile phone 100 sends the second video stream to the PC 200.

1208. The PC 200 receives and decodes the second video stream, to obtain the identifier information of the music application, the information about the second area, and the display content information of the second area.

1209. The PC 200 displays a window 40 of the music application in a corresponding area based on the information about the second area and the display content information of the second area.

It should be understood that for a process of steps 1205 to 1209 described above, refer to steps 1003 to 10007 in FIG. 10 and the process described in FIG. 11A, FIG. 11B, and FIG. 11C in which the mobile phone 100 encodes the second video stream and sends the second video stream to the PC 200, and the display screen of the PC 200 displays the window 40 of the music application. Details are not described herein again. In this case, the music application of the mobile phone 100 may run on the PC 200 based on the operation of the user.

In the foregoing method, the PC 200 does not need to install an application of the mobile phone 100, and different applications of the mobile phone 100 may be displayed by using different windows. The user may run the application of the mobile phone 100 on the PC 200, and display one window for each application, and the PC 200 may display a plurality of windows at the same time.

In another possible implementation, after a connection is established between the mobile phone 100 and the PC 200, in the process shown in FIG. 5A, FIG. 5B, and FIG. 5C, the mobile phone application window 30 may be displayed in the main interface 402 of the PC 200, and the mobile phone application window 30 may include all applications of the mobile phone 100. The following describes a process in this implementation with reference to FIG. 13.

Figure 13:
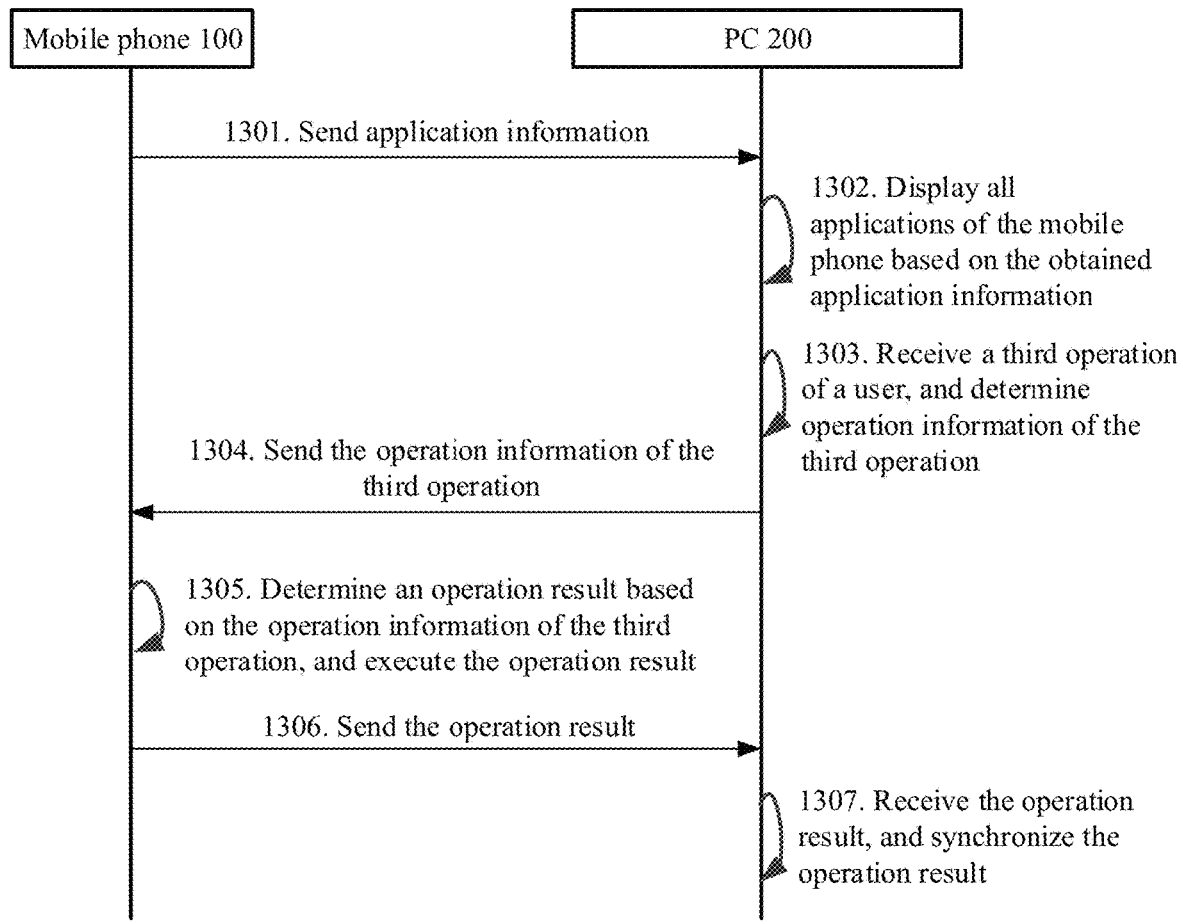
FIG. 13 is another schematic flowchart of a multi-window display method according to an embodiment of this application.

FIG. 13 is another schematic flowchart of a multi-window display method according to an embodiment of this application. As shown in FIG. 13, the method 1300 may include the following steps.

1301. A mobile phone 100 sends application information to a PC 200.

1302. The PC 200 displays all applications of the mobile phone 100 based on the obtained application information.

It should be understood that in this implementation, after the mobile phone 100 establishes a connection to the PC 200, the mobile phone 100 may automatically send, to the PC 200, information about all applications at the application program layer shown in FIG. 3A. Alternatively, as shown in (b) in FIG. 4, when tapping/clicking an "EMUJI desktop" menu in a menu window 20, a user triggers the PC 200 to send an application obtaining request to the mobile phone 100, to request to obtain the application information of the mobile phone 100.

It should be further understood that the application information herein may include information such as names, identifiers (identification, ID), and icons of all the applications at the application program layer. After receiving the application information, the PC 200 displays each application in a mobile phone application window 30 based on the name, the ID, and the icon of the application, to display all the applications of the mobile phone 100. The display may be shown in FIG. 5C. It should be further understood that the identifier of the application may be represented as a package name, the package name includes a string, and the PC 200 may determine a music application based on the package name. It should be further understood that the PC 200 displays an application list of the mobile phone 100 by using the mobile phone application window 30. All application programs in the application list are application programs installed on the mobile phone 100. The PC 200 may not install an application program of the mobile phone 100, and only displays an icon of the application list of the mobile phone 100 by using the mobile phone application window 30.

1303. The PC 200 receives a third operation of the user, and determines operation information of the third operation.

1304. The PC 200 sends the operation information of the third operation to the mobile phone 100.

Specifically, the user may tap/click any application in the application list presented on the EMUJI desktop in a main interface 402 of the PC by using a peripheral input device such as a mouse or a keyboard. In response to the tapping/clicking operation of the user, a window of the tapped/clicked application may automatically pop up on the PC, to run the application.

It should be understood that the third operation may be a tapping/clicking operation performed by the user on a control in an application window on the PC 200, and is used to execute a function of the control.

Optionally, the operation information of the third operation further includes at least one type of information such as a name, an ID, and an icon of a control in an interface of the music application.

Optionally, the operation information of the third operation may include an event type of the third operation and identifier (identification, ID) information of a function control on which the third operation is performed.

For example, when the user taps/clicks a play control in a window 40 of the music application of the PC 200, the PC 200 may send, to the mobile phone 100, a "touch event" event of tapping/clicking the play control, for example, coordinates of the window 40 of the music application in which the "touch event" occurs, and a name, an ID, and an icon of the play control in the window 40 of the music application and coordinates of the play control on the PC 200.

The PC 200 transfers the "touch event" to the mobile phone 100. A system of the mobile phone 100 determines, based on the coordinates of the window 40 of the music application, that the "touch event" occurs in the music application, and sends the "touch event" to the corresponding music application. The music application determines, based on the name, the ID, and the icon of the play control and the coordinates of the play control on the PC 200, that the "touch event" is used to tap the play control. It should be understood that the process may be a background running process of the mobile phone 100.

It should be further understood that, in this embodiment of this application, a first operation, a second operation, and the third operation may be different operations performed for different devices. Running the music application is used as an example. For the mobile phone, the user may run the music application by performing a touching and tapping operation. For the PC, the user may run the music application by performing a clicking operation or double-clicking operation by using a peripheral input device such as a mouse or a keyboard. Alternatively, if the PC is a device with a touchscreen, the user may run the music application through touching and tapping. Operation types of the first operation, the second operation, and the third operation are not limited in this embodiment of this application.

1305. The music application of the mobile phone 100 determines an operation result based on the operation information of the third operation, and executes the operation result.

1306. The mobile phone 100 sends the operation result to the PC 200.

1307. The PC 200 receives the operation result sent by the mobile phone 100, and synchronizes the operation result.

Optionally, a process of sending the operation result to the PC 200 by the mobile phone 100 in step 1306 may correspond to the process of creating a virtual area and sending the first video stream to the PC 200 by the mobile phone 100 in FIG. 9A, FIG. 9B, and FIG. 9C and FIG. 11A, FIG. 11B, and FIG. 11C. In other words, the process of sending the operation result may also be completed by using a video stream sending process. Specifically, after the operation of tapping the music play control is performed, the mobile phone 100 re-determines the first video stream based on the music application currently running (running in the background or running in a current interface of the mobile phone) on the mobile phone 100, so that the PC 200 displays the window 40 of the music application, that is, the operation of tapping/clicking the music play control is completed in the window 40 of the music application on the PC 200, for example, if music play is paused, the music play control changes to a pause state in the window 40 of the music application of the PC 200.

It should be understood that the following is described above: An operation of the user on the PC 200 side is transferred back to the mobile phone 100. Similarly, an operation performed by the user on the mobile phone 100 may also be directly transferred to the PC 200.

Details are not described herein. A reverse control module of the MSDP service APK of each of the mobile phone 100 and the PC 200 may participate in the process of transferring an operation back, and it is ensured that a corresponding operation is performed synchronously on the mobile phone 100 and the PC 200.

In the foregoing solution, the user may perform an operation on any control of a mobile phone application in a window that is of the application and that is displayed on the PC 200. The operation may be transferred back to the mobile phone 100, and the mobile phone 100 executes an operation result, and transfers an execution result to the PC 200, so that the operation result executed by the mobile phone 100 can be synchronized in the window that is of the application and that is on the PC 200, thereby improving use efficiency and use experience of the mobile phone application.

It may be understood that, to implement the foregoing functions, the electronic device such as a mobile phone and a PC includes corresponding hardware and/or software modules for performing the functions. With reference to the example algorithm steps described in the embodiments disclosed in this specification, the embodiments of this application can be implemented in a form of hardware or a combination of hardware and computer software.

Whether a function is performed by hardware or hardware driven by computer software depends on particular applications and design constraints of the technical solutions. A person skilled in the art may use different methods to implement the described functions for each particular application with reference to the embodiments, but it should not be considered that the implementation goes beyond the scope of the embodiments of this application.

In the embodiments, function modules of the electronic device may be obtained through division according to the foregoing method examples. For example, the function modules may be obtained through division corresponding to various functions, or two or more functions may be integrated into one processing module. The integrated module may be implemented in a form of hardware. It should be noted that, in the embodiments, division into modules is an example, and is merely logical function division. In actual implementation, another division manner may be used.

An embodiment further provides a computer readable storage medium. The computer readable storage medium stores a computer instruction. When the computer instruction runs on an electronic device, the electronic device is enabled to perform the related method steps, to implement the multi-window display method in the foregoing embodiment.

An embodiment further provides a computer program product. When the computer program product runs on a computer, the computer is enabled to perform the related steps, to implement the multi-window display method in the foregoing embodiment.

In addition, an embodiment of this application further provides an apparatus. The apparatus may be specifically a chip, a component, or a module. The apparatus may include a processor and a memory that are connected to each other. The memory is configured to store a computer executable instruction. When the apparatus runs, the processor may execute the computer executable instruction stored in the memory, so that the chip performs the multi-window display method in the foregoing method embodiments.

The electronic device, the computer storage medium, the computer program product, or the chip provided in the embodiments is configured to perform a corresponding method provided above. Therefore, for beneficial effects that can be achieved by the electronic device, the computer storage medium, the computer program product, or the chip, refer to beneficial effects of the corresponding method provided above. Details are not described herein again.

The foregoing descriptions about implementations allow a person skilled in the art to understand that, for the purpose of convenient and brief description, division into the foregoing function modules is merely an example for illustration. In actual application, the foregoing functions can be allocated to different modules for implementation according to a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, division into the modules or units is merely logical function division. There may be another division manner in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such an understanding, the technical solutions of the embodiments of this application essentially, or the part contributing to the prior art, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in the embodiments of this application. The foregoing storage medium includes: any medium that can store program code, such as a USB flash drive, a removable hard disk, a read only memory (read only memory, ROM), a random access memory (random access memory, RAM), a magnetic disk, or an optical disc.

The foregoing content is merely specific implementations of the embodiments of this application, but are not intended to limit the protection scope of the embodiments of this application. Any variation or replacement readily figured out by a person skilled in the art within the technical scope disclosed in the embodiments of this application shall fall within the protection scope of the embodiments of this application. Therefore, the protection scope of the embodiments of this application should be subject to the protection scope of the claims.

What is claimed is:

1. A first electronic device comprising one or more processors, a memory storing one or more application programs, and when the one or more programs are executed by the processor, the first electronic device is configured to perform:
   establishing, by a first electronic device, a connection to a second electronic device;
   receiving, by the first electronic device, first interface information sent by the second electronic device;
   displaying, by the first electronic device, a first window, and displaying a first interface in the first window based on the first interface information, wherein the first interface comprises an application icon of a first application;
   receiving, by the first electronic device, a first operation on the application icon of the first application;
   sending, by the first electronic device, a first operation instruction to the second electronic device in response to the first operation, wherein the first operation instruction is used to enable the second electronic device to start the first application;
   receiving, by the first electronic device, second interface information of the first application sent by the second electronic device;
   displaying, by the first electronic device, a second interface in the first window according to the second interface information; and
   receiving, by the first electronic device, a second operation; and
   in response to the second operation, displaying the first interface in the first window, and displaying the second interface in a second window.

2. The first electronic device according to claim 1, wherein the first application is a video application, the second interface is a video playing interface, and a width of the second window is greater than a height of the second window.

3. The first electronic device according to claim 1,
   wherein the first window and the second window are same size; or
   wherein the first window and the second window are different sizes.

4. The first electronic device according to claim 1, wherein the first window further comprises a first menu bar.

5. The first electronic device according to claim 4, wherein the second window comprises a second menu bar, and the second menu bar comprises a hide to sidebar key, and after the displaying, by the first electronic device, the second window, the first electronic device is further configured to perform:
   receiving, by the first electronic device, a fifth operation on a hide to sidebar key of the second window; and
   in response to the fifth operation, hiding, by the first electronic device, the second window.

6. The first electronic device according to claim 1, wherein the second window comprises a second menu bar, and the second menu bar comprises a maximize key, and after the displaying, by the first electronic device, the second window, the first electronic device is further configured to perform:
   receiving, by the first electronic device, a third operation on the maximize key; and displaying, by the first electronic device, the second window in full screen in response to the third operation.

7. The first electronic device according to claim 1, wherein the first interface is an interface being displayed by the second electronic device, or the second interface is an interface being displayed by the second electronic device.

8. The first electronic device according to claim 1, wherein a size of the second interface of the second window is N times the size of a display area of the second electronic device, wherein N is greater than 0.

9. The first electronic device according to claim 1, wherein the first electronic device is a PC, and the second electronic device is a mobile phone.

10. The first device electronic according to claim 1, wherein the displaying, by the first electronic device, the second window comprises:
displaying, by the first electronic device, the second window at an uppermost layer.

11. The first electronic device according to claim 1, wherein after the displaying, by the first electronic device, the second window, the first electronic device is further configured to perform:
receiving, by the first electronic device, a sixth operation of selecting the first window by a user; and
switching, by the first electronic device, the first window to an uppermost display in response to the sixth operation.

12. The first electronic device according to claim 1, wherein the first electronic is device further configured to perform:
receiving, by the first electronic device, a seventh operation of moving the first window by the user; and in response to the seventh operation, changing, by the first electronic device, a display position of the first window; or
receiving, by the first electronic device, a seventh operation of moving the second window by the user; and changing, by the first electronic device, a display position of the second window in response to the seventh operation.

13. The first electronic device according to claim 1, wherein the first electronic device is further configured to establish a connection with the second electronic device by using Wi-Fi, by using Bluetooth, or by scanning a code.

14. The first electronic device according to claim 1, wherein the second window comprises a second menu bar, wherein the second menu bar comprises a close key, and wherein the first electronic device is further configured to perform:
receiving, by the first electronic device, a fourth operation on the close key; and
closing, by the first electronic device, the second window in response to the fourth operation, and sending a second operation instruction to the second electronic device, wherein the second operation instruction instructs the second electronic device to exit running of the first application.

15. A system, comprising a first electronic device comprising one or more processors and a memory storing one or more application programs, and a second electronic device comprising one or more processors and a memory storing one or more application programs, wherein when the first and second electronic devices' respective processors execute the respective programs the system is configured to perform:
establishing, by the second electronic device, a connection to the first electronic device;
sending, by the second electronic device, first interface information to the first electronic device;
displaying, by the first electronic device, a first window, and displaying a first interface in the first window based on the first interface information, wherein the first interface comprises an application icon of a first application;
receiving, by the first electronic device, a first operation on the application icon of the first application;
sending, by the first electronic device, a first operation instruction to the second electronic device in response to the first operation, wherein the first operation instruction is used to enable the second electronic device to start the first application;
sending, by the second electronic device, second interface information of the first application to the first electronic device;
displaying, by the first electronic device, a second interface in the first window according to the second interface information; and
receiving, by the first electronic device, a second operation; and
in response to the second operation, displaying the first interface in the first window, and displaying the second interface in a second window.

16. The system according to claim 15, wherein the first application is a video application, the second interface is a video playing interface, and a width of the second window is greater than a height of the second window.

17. The system according to claim 15,
wherein the first window and the second window are same size; or
wherein the first window and the second window are different sizes.

18. The system according to claim 15, wherein the first window further comprises a first menu bar.

19. The system according to claim 15, wherein the second window comprises a second menu bar, and the second menu bar comprises a maximize key, and after the displaying, by the first electronic device, a second window, the first electronic device is further configured to perform:
receiving, by the first electronic device, a third operation on the maximize key; and;
displaying, by the first electronic device, the second window in full screen in response to the third operation.

20. The system according to claim 15, wherein the second window comprise a second menu bar and the second menu bar comprises a hide to sidebar key, and after the displaying, by the first electronic device, the second window, the first electronic device is further configured to perform:
receiving, by the first electronic device, a fifth operation on a hide to sidebar key of the second window; and
in response to the fifth operation, hiding, by the first electronic device, the second window.

21. The system according to claim 15, wherein the first electronic device is a PC, and the second electronic device is a mobile phone.

22. The system according to claim 15, wherein the displaying, by the first electronic device, the second window comprises:
displaying, by the first electronic device, the second window at an uppermost layer.

23. The system according to claim 15, wherein after the displaying, by the first electronic device, the second window, the first electronic device is further configured to perform:
receiving, by the first electronic device, a sixth operation of selecting the first window by a user; and switching, by the first electronic device, the first window to an uppermost display in response to the sixth operation.

24. The system according to claim 15, wherein the first electronic is device further configured to perform:
   receiving, by the first electronic device, a seventh operation of moving the first window by the user; and in response to the seventh operation, changing, by the first electronic device, a display position of the first window; or
   receiving, by the first electronic device, a seventh operation of moving the second window by the user; and changing, by the first electronic device, a display position of the second window in response to the seventh operation.

25. The system according to claim 15, wherein the first electronic device is further configured to establish a connection with the second electronic device by using Wi-Fi, by using Bluetooth, or by scanning a code.

26. The system according to claim 15, wherein the system is further configured to perform:
   receiving, by the first electronic device, a fourth operation on the close key; and
   closing, by the first electronic device, the second window in response to the fourth operation, and sending a second operation instruction to the second electronic device, wherein the second operation instruction instructs the second electronic device to exit running of the first application.

\* \* \* \* \*